(12) United States Patent
Bueche et al.

(10) Patent No.: US 11,899,714 B1
(45) Date of Patent: Feb. 13, 2024

(54) VOICE CONVERSATIONAL SEARCH CONSTRAINT MANAGEMENT

(71) Applicant: Amazon Technologies, Inc., Seattle, WA (US)

(72) Inventors: Edward Bueche, Pleasanton, CA (US); Francois Mairesse, San Francisco, CA (US); Amina Shabbeer, San Francisco, CA (US); Warren D. Freitag, San Mateo, CA (US); Jonathan Pollack, Half Moon Bay, CA (US); Charles Lee Thorp, Phoenix, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 16/144,974

(22) Filed: Sep. 27, 2018

(51) Int. Cl.
*G06F 16/635* (2019.01)
*G06F 16/68* (2019.01)
*G06F 3/16* (2006.01)
*G10L 15/22* (2006.01)
*G06F 16/2453* (2019.01)

(52) U.S. Cl.
CPC ............ *G06F 16/686* (2019.01); *G06F 3/16* (2013.01); *G06F 16/24542* (2019.01); *G06F 16/635* (2019.01); *G10L 15/22* (2013.01)

(58) Field of Classification Search
CPC ............... G06F 16/686; G06F 16/635; G06F 16/24542; G06F 3/16; G10L 15/22
USPC ...................................................... 707/706
See application file for complete search history.

(56) References Cited

U.S. PATENT DOCUMENTS

| | | | |
|---|---|---|---|
| 10,043,516 B2 * | 8/2018 | Saddler | G06F 3/167 |
| 2010/0114944 A1 * | 5/2010 | Adler | G10L 15/22 |
| | | | 707/770 |
| 2013/0111348 A1 * | 5/2013 | Gruber | G10L 15/1815 |
| | | | 715/727 |

* cited by examiner

Primary Examiner — Hosain T Alam
Assistant Examiner — Tracy M McGhee
(74) Attorney, Agent, or Firm — Kilpatrick Townsend & Stockton LLP

(57) ABSTRACT

Voice data from a current conversation between a user and a voice-controlled user device can be used to determine a search constraint for searching a database. Other search constraints can be determined based at least in part on the current conversation, a previous conversation, and/or a previous action. Properties can be associated with the search constraints. Once the search constraints have been determined, a plurality of search query plans is determined and a first search query plan is executed to query the database.

20 Claims, 13 Drawing Sheets

VOICE CONVERSATIONAL SEARCH CONSTRAINT MANAGEMENT

BACKGROUND

Voice interfaces of electronic devices, such as voice-controlled devices, can be used to receive and process instructions from users. For example, a user can instruct a voice-controlled device including a speaker to play a particular song by a particular artist. So long as the user correctly and clearly identifies the song by the correct title and the artist by the correct name, a backend server associated with the voice-controlled device will likely be able to look up the song in a storage location and, assuming it is found, provide it to the voice-controlled device for playback.

When the user's instructions with respect to a user goal (e.g., to play a song) are vague or otherwise less definite, correctly identifying the user goal may prove challenging.

BRIEF DESCRIPTION OF THE DRAWINGS

Various examples in accordance with the present disclosure will be described with reference to the drawings, in which.

DETAILED DESCRIPTION

Figure 1:
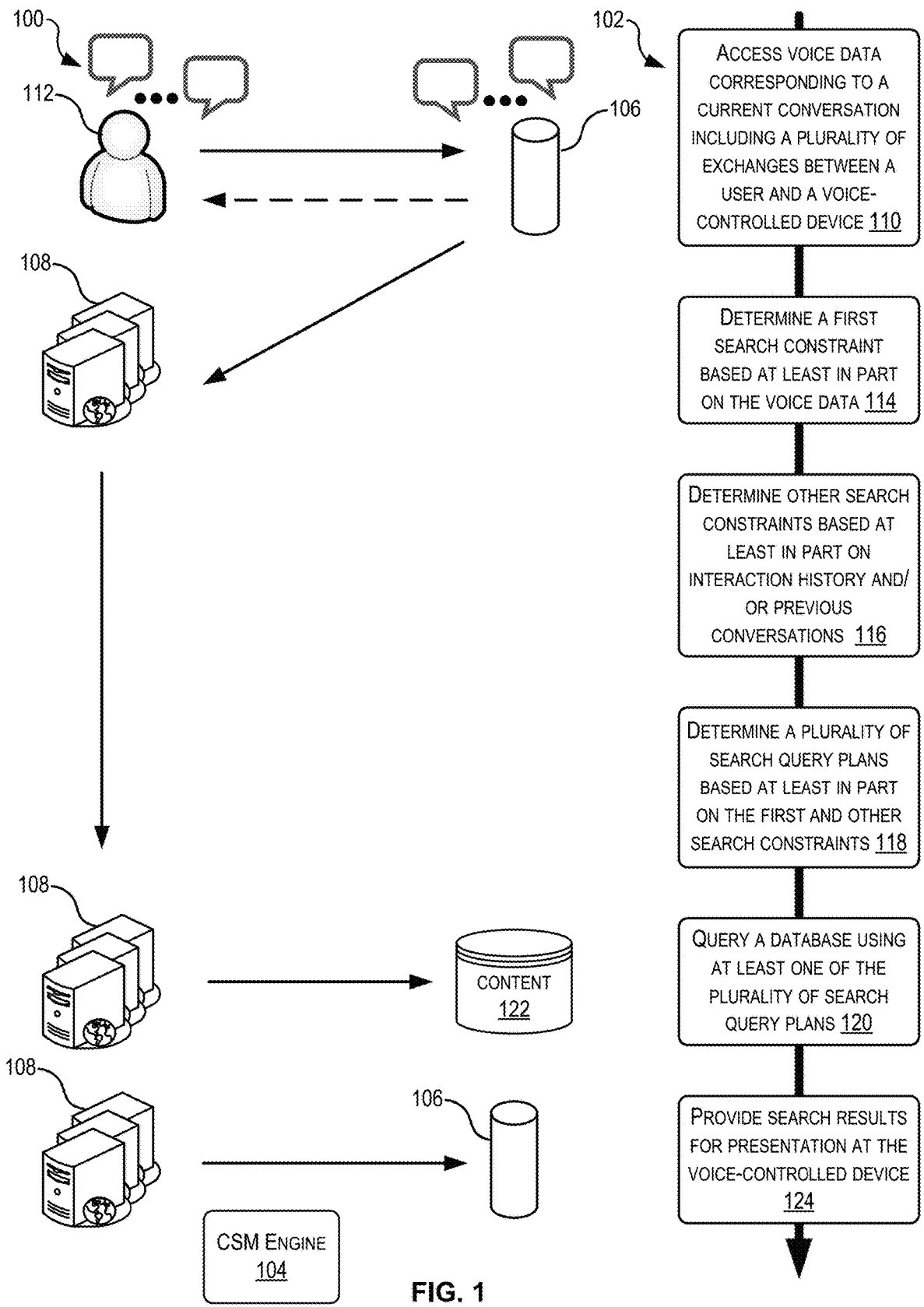
FIG. 1 is an example block diagram and associated flowchart showing a process for implementing techniques relating to conversational search management, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to, among other things, techniques for conversational search management in the context of voice interfaces of voice-controlled devices. Conversational search management includes providing opportunities for a user to informally converse with a voice-controlled device via a voice interface in order to ascertain a user goal. This is especially true in circumstances when the user does not know exactly what her user goal is. Conversing informally can include providing to the voice-controlled device a number of prompts, questions, content samples, or the like, and requesting verbal feedback from the user. This feedback, which is received in the form of voice data, can then be used to determine search constraints for guiding future searching. When multiple search constraints are present and the precise aspects of the user goal is still unknown (e.g., it is known that the user wants to listen to music, but the exact music is unknown), the search constraints can be selectively grouped into different subsets of constraints to create a set of search query plans. This includes filtering off certain constraints in a selective manner. The search query plans can then be executed either in an ordered series, which may be ranked, or in parallel, and relevant results can be presented to the user via the voice-controlled device. The different results are ranked in order of their relevance or confidence. That relevance or confidence is determined by multiple factors including: the number and types of constraints used and quality of the results returned (e.g., how popular the content is).

Turning now to a particular example, a system is provided that includes a service provider computer and a voice-controlled device connected via one or more networks. The voice-controlled device includes a voice interface, and input/output devices such as a microphone and a speaker. The voice-controlled device receives voice data from the user and determines, based at least in part on the voice data, if a user goal can be derived and/or whether to determine search constraints. For example, assume that the user said "we are having a barbeque tonight" to the voice-controlled device paired with a streaming music service. From this voice data, it may be known by the voice-controlled device that the user would like to find some music to play. But, because the prompt "we are having a barbeque tonight" does not reveal values for the search constraints relating to finding music, the voice-controlled device is unable to identify particular music based on the prompt. To better ascertain the particular music, one or more search constraints can be determined based on interactions with the user. For example, the system may determine a search constraint that identifies the occasion as being dinner or a barbeque based at least in part on the response "we are having a barbeque tonight." Another search constraint may identify a genre of country or a playlist entitled "Summer BBQ playlist" as being relevant to the barbeque based at least in part on the same response. To obtain additional search constraints, additional questions may be posed to the user. For example, in response to "we are having a barbeque tonight," the voice-controlled device may ask, "who is coming over?" In response, the user may respond by saying, "my mom and dad." This additional portion of the conversation (e.g., question and answer) can be used to generate an additional search constraint. For example, the system may identify a search constraint that excludes explicit lyrics or one that sets the genre to something the parents might enjoy (e.g., classic rock). Using the search constraints and potentially others, a search query plan is generated. The search query plan includes some a combination of search constraints, and is used to query a database or full text index of the database (e.g., to search for music to recommend for the barbeque). Results of the search can be surfaced to the user via the voice-controlled device as a list of results, as a single suggestion, and/or may even begin playing the top result. At this point, the user can again provide feedback (e.g., by stating "I don't like this playlist" or any other suitable phrase), which can again be used to determine another search constraint that will be used to refine the next search.

In some examples, other search constraints can be determined based at least in part on earlier conversations between the user and the voice-controlled device. For example, the user may have previously stated that she dislikes a playlist entitled "Summer BBQ playlist" when it was suggested at an earlier occasion. Other search constraints can also be determined based at least in part on earlier actions performed by the user. For example, a listening history of the user can be used to determine a search constraint that identifies that the user listens to music from Broadway musicals. A complete set of all search constraints is then divided into non-exclusive subsets of search constraints defined as search query plans. Each search query plan can include a slightly different subset of search constraints in order to provide search results of varying scope. For example, a first search query plan, which may include all search constraints, may return zero results when used to search the music streaming service because the first search query plan was too specific and/or contained conflicting constraints (e.g., artist is Madonna and genre is punk rock). A second search query plan, which may include fewer than all of the search constraints, may return a different set of results. These results can be presented to the user for confirmation.

The techniques described herein improve the functioning of computer systems that provide content items to voice-controlled devices. In particular, because more precise searching can be performed as compared to traditional techniques that attempt to search based at least in part on undefined inputs, bandwidth savings are realized. This is true even though there may be additional information transfer prior to executing the search as compared to traditional techniques. This is because the search result package that is ultimately sent to the voice-controlled device will include fewer results and thereby require less bandwidth to transfer. Additionally, computer systems that utilize the techniques described herein function to conserve computing resources (e.g., processing cycles). This is because instead of performing broad searches of text indexes and associated databases, the techniques described herein enable more targeted searching resulting in fewer search results as a result of the search.

Additionally, as described in some examples, techniques relating to conversational search management improve efficiency of using the voice-controlled device and improve an overall user experience by reducing the cognitive load of interacting with the voice-controlled device. Such efficiency is possible because, as the results presented to the user have been particularly tailored to an easier conversation with the user, it is less likely that the user has to devote her time to sort through the results to identify what she really wanted.

Similarly, because the system is able to determine search constraints based at least in part on ordinary conversations with the user, the user's cognitive load is reduced and the user gets her answer faster. In a normal voice search paradigm the user must provide all of the search terms in their current utterance: for example, "play a playlist with upbeat swings songs from the 1940's that have benny goodman in it." Such a phrase can be overwhelming to user and somewhat stressful. Additionally, some voice search systems may only allow a limited time for obtaining voice commands (e.g., a 15 second command cut off). The techniques described herein present a more natural way for a user to express her desire in multiple sentences in a conversation. For example, "Get me a playlist with swing songs"
"Oh, and make it upbeat"
"1940's swing with Benny Goodman"
"My brother Fred is coming over"

These sentences can be processed to identify relevant search constraints to quickly identify the most relevant music given the sentences and without the user having to provide a precise command. Thus, the user does not have to remember communication protocols, naming conventions, names and titles themselves, etc.; instead, the user simply begins talking about what is going on and/or her desires and the system determines her goal on her behalf.

Turning now to the figures, FIG. 1 is an example block diagram 100 and associated flowchart showing a process 102 for implementing techniques relating to conversational search management, according to at least one example. The diagram 100 depicts devices, objects, and the like that correspond to the process 102. The process 102 can be performed by a conversational search management (CSM) engine 104, which may be implemented in a server computer (e.g., service provider 108) to provide search results generated using conversational search techniques. In some examples, at least a portion of the CSM engine 104 is implemented by a user device (e.g., a voice-controlled device 106).

The process 102 may begin at 110 by accessing voice data corresponding to a current conversation including a plurality of exchanges between a user 112 and a voice-controlled device (e.g., the voice-controlled device 106). The current conversation may include the user 112 speaking at the voice-controlled device 106 via a voice interface of the voice-controlled device 106. In some examples, the current conversation may include prompts from the voice-controlled device 106. In some examples, the plurality of exchanges includes a plurality of utterances from the user 112 to the voice-controlled device 106. The voice-controlled device 106 processes these utterances and, in some examples, returns prompts to the user 112 for more information. Thus, unlike traditional approaches for voice search, the CSM engine 104 can collect seemingly random utterances that form the current conversation and turn them into search constraints, as described below.

At 114, the process 102 may include determining a first search constraint based at least in part on the voice data. The first search constraint may include defining properties associated therewith. This search constraint attempts to represent a user goal associated with the current conversation.

At 116, the process 102 may include determining other search constraints based at least in part on interaction history and/or previous conversations. These other search constraints may additionally be relevant to represent the user goal. For example, when the voice-controlled device 106 is associated with a music streaming service, the interaction history may represent a listening history of the user 112, which may be helpful to determining the user goal of the current conversation. Additionally, previous statements and/or answers to prompts provided in earlier conversations may be relevant to identifying the user goal.

At 118, the process 102 may include determining a plurality of search query plans based at least in part on the first and other search constraints. The plurality of search query plans may include unique combinations of a set of search constraints including the first search constraints and the other search constraints. The plurality of search query plans can be determined in accordance with a set of filtering rules. The set of filtering rules may define which search constraints to remove (e.g., to expand the scope of search), which sets of constraints to avoid (e.g., two that are exactly opposite), and other such variations of the search constraints. In some examples, the search constraints may be filtered responsive to user input. For example, a user may be enabled to remove constraints verbally. To improve precision of the search query plans, the user can be prompted for reformulation of constraints and/or deletions of constraints based on how the constraints contribute to reaching a user goal and/or the system's confidence that the user's goal was correctly understood.

In some examples, the plurality of search query plans may increase at least until a fixed number is reached and/or may not exceed a fixed number. In other examples, the number of search query plans is open-ended and only constrained by physical resources and response time targets. Each search query plan, when executed, may be capable of querying a database or a full text index of the database.

At 120, the process 102 may include querying a content item database 122 and/or associated full text index using at least one of the search query plans. Discussion herein of searching a database also includes searching any associated indexes such as a full text index. As described in detail herein, the content item database 122 may include electronic content items such as music items, playlists, etc. Querying the content item database 122 may include querying one or more indexes corresponding to the content item database 122. This can include using the search constraints of the at least one search query plan as inputs to define the query described at 120.

At 124, the process 102 may include providing search results for presentation at the voice-controlled device 106. For example, when the search result is an electronic content item and/or a list of electronic content items (e.g., a playlist), providing the search results may include beginning playback of the electronic content item and/or the playlist. In some examples, a message is provided prior to beginning playback. For example, the message may announce the search results prior to beginning playback (e.g., "Now playing the playlist 'Top 100 Songs of 2018'").

Figure 2:
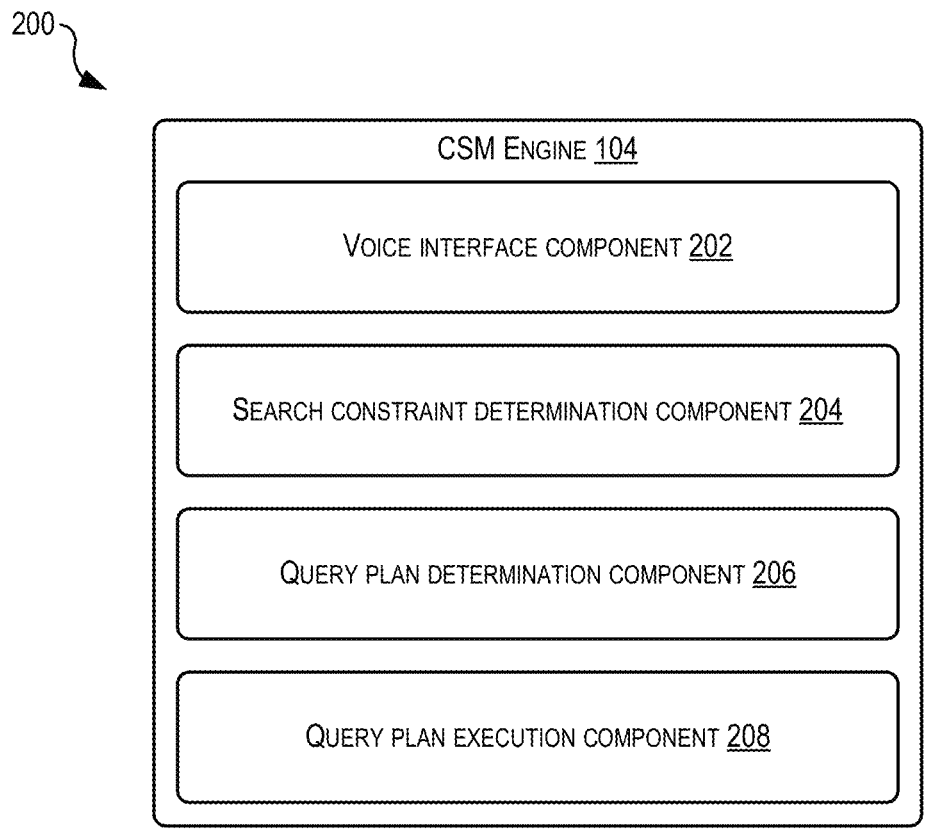
FIG. 2 is an example device including a plurality of components for implementing techniques relating to conversational search management, according to at least one example.

FIG. 2 illustrates an example device 200 including the CSM engine 104 and a plurality of components 202-208, according to at least one example. The CSM engine 104 may be configured to manage one or more sub-modules, components, engines, and/or services directed to examples disclosed herein. For example, the CSM engine 104 includes a voice interface component 202, a constraint determination component 204, a query plan determination component 206, and a query plan execution component 208. While these modules are illustrated in FIG. 2 and will be described as performing discrete tasks with reference to the flow charts, it is understood that FIG. 2 illustrates example configurations and other configurations performing other tasks and/or similar tasks as those described herein may be implemented according to the techniques described herein. Other modules, components, engines, and/or services may perform the same tasks as the CSM engine 104 or other tasks. Each module, component, or engine may be implemented in software, firmware, hardware, and in any other suitable manner.

Generally, the voice interface component 202 is configured to provide a voice interface to enable communication between a user such as the user 112 and a device such as the voice-controlled device 106. For example, this can include enabling conversations between the user 112 and the voice-controlled device 106, receiving instructions from the user 112, receiving feedback from the user 112, providing search results to the user 112, and any other suitable communication approach.

Generally, the constraint determination component 204 is configured to determine search constraints for inclusion in search query plans. The search constraints may represent a user goal, e.g., for the user 112.

Generally, the query plan determination component 206 is configured to determine search query plans based at least in part on the search constraints and filtering rules. For example, the query plan determination component 206 can determine search query plans, rank search query plans, update search query plans, and the like based at least in part on filtering rules, user feedback, contextual information, content of the search constraints, and any other suitable information.

Generally, the query plan execution component 208 is configured to execute the search query plans determined by the query plan determination component 206. For example, executing the search can include submitting search queries to one or more databases, with the corresponding search constraints constraining the search queries.

Figure 3:
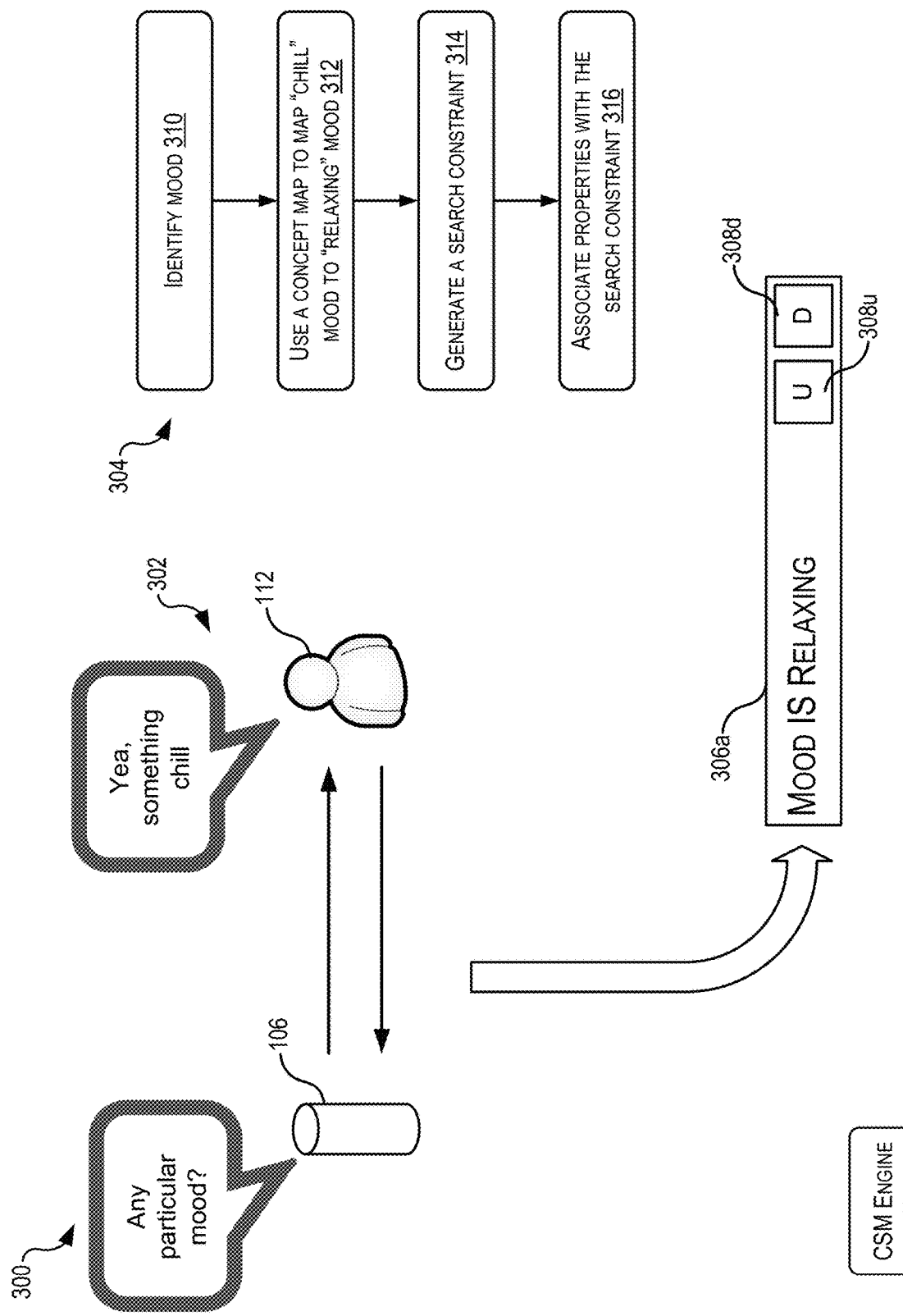
FIG. 3 is an example diagram illustrating an aspect of conversational search management relating to determining search constraints, according to at least one example.

FIG. 3 is an example diagram 300 illustrating an aspect of conversational search management relating to determining search constraints, according to at least one example. In particular, the diagram 300 depicts a conversation 302, a flowchart showing a process 304 relating to determining search constraints, and an example search constraint 306a generated by the process 304 based at least in part on the conversation 302.

The conversation 302, which may be a current conversation or a past conversation, may include a question from the voice-controlled device 106 (e.g., "Any particular mood?"). The question from the voice-controlled device 106 may be prompted based at least in part on other statements and/or questions from the user 112. For example, while not illustrated, the user 112 may have simply said "Play some music." In any event, in response to the question from the voice-controlled device 106, the user 112 may answer (e.g., "Yea, something chill."). In some examples, the voice-controlled device 106 may be prompted based at least in part on properties pulled from queries run with implicit constraints determined from the user's preferences that were determined from their interaction history or inferred from it. For example, if the user listened to Benny Goodman then a constraint could be added to the query (e.g., artist is Benny Goodman) even though the user did not say this explicitly in the conversation. Some results may have genre properties associated with Benny Goodman that allow the voice-controlled device 106 to prompt the user (e.g., "would you like some jazz or swing music or something else?").

The process 304 may be performed by the CSM engine 104.

The process 304 may begin at 310 by identifying a mood of the conversation 302. In some examples, this may be performed by the constraint determination component 204 (FIG. 2). Identifying the mood may include identifying that the user stated "chill" in response to the prompt regarding the mood.

At 312, the process 304 may include using a concept map to map "chill" mood to "relaxing" mood. This may be performed by the constraint determination component 204. In some examples, the concept map may include a table that maps various terms to existing moods and/or genres. For example, in a music example, the moods may map to genres of music that typify the particular mood. In this example, the term "chill," which may not be represented as a mood, may be mapped to "relaxing"—a represented mood, which may again map to one or more genres of music.

At 314, the process 304 may include generating a search constraint, e.g., the search constraint 306a. This may be performed by the constraint determination component 204. The search constraint 306a may represent the conversation 302 in a Boolean relationship. For example, the search constraint 306a states that the Mood IS Relaxing, e.g., mood=relaxing. The search constraint 306a, if used to search a database, would return results tagged with metadata of relaxing mood and/or relaxing genre.

At 316, the process 304 may include associating properties 308 with the search constraint 306a. This may be performed by the constraint determination component 204. The properties 308 relevant to this search constraint 306a include unselective property 308u and direct property 308d.

The unselective property 308u indicates that, although the search constraint 306a is useful for narrowing results, it is not precise. This is because mood alone may map to more than one genre of music and/or eras of music.

The direct property 308d indicates that the search constraint 306a was derived from a statement made by the user 112 during the conversation 302 and that it maps directly to metadata, e.g., mood. Additional discussion of the search constraint 306a continues with respect to FIG. 8.

Figure 4:
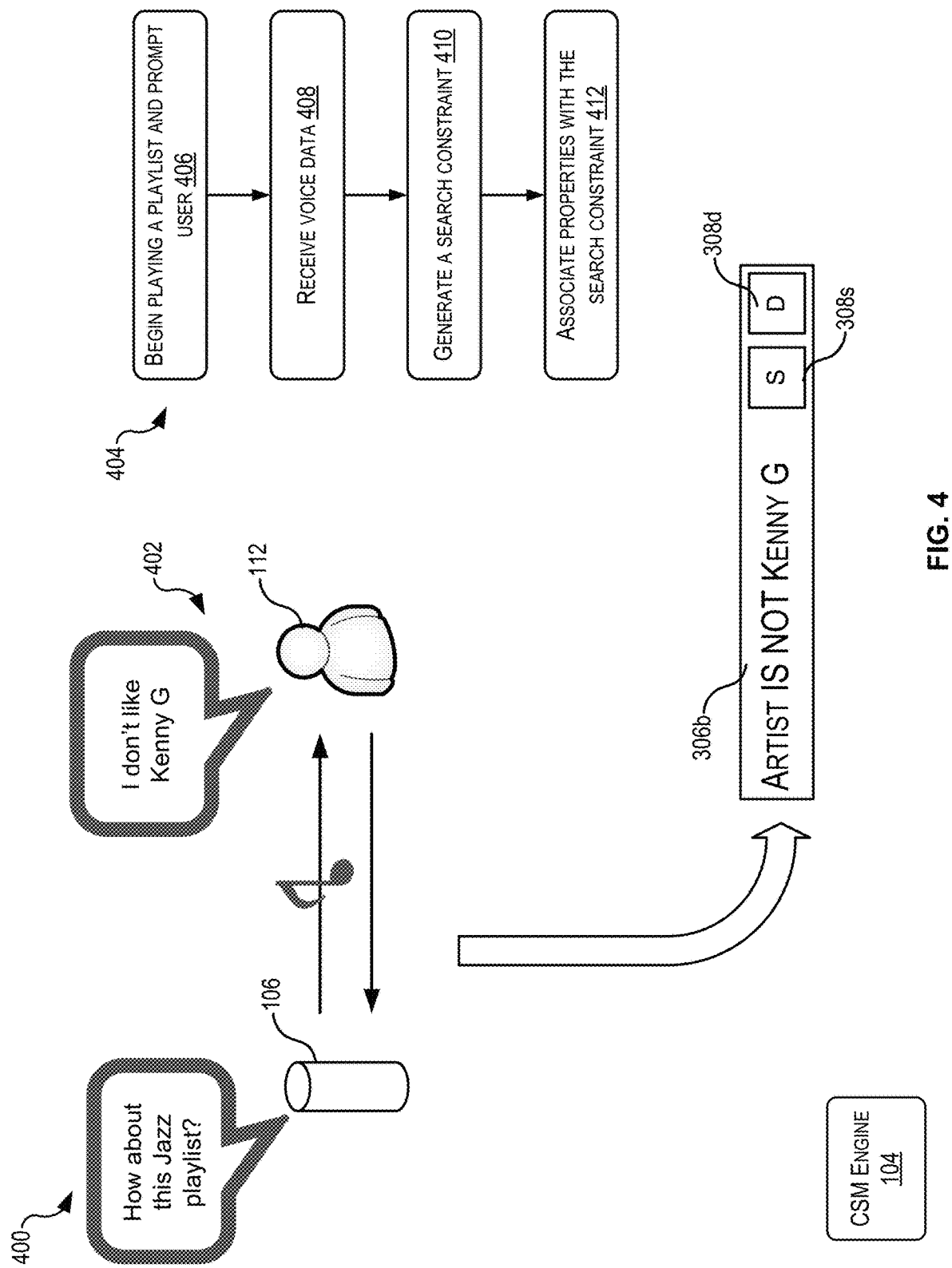
FIG. 4 is an example diagram illustrating an aspect of conversational search management relating to determining search constraints, according to at least one example.

FIG. 4 is an example diagram 400 illustrating an aspect of conversational search management relating to determining search constraints, according to at least one example. In particular, the diagram 400 depicts a conversation 402, a flowchart showing a process 404 relating to determining search constraints, and an example search constraint 306b generated by the process 404 based at least in part on the conversation 402.

The conversation 402, which may be a current conversation or a past conversation, may include a question from the voice-controlled device 106 (e.g., "How about this Jazz playlist?") followed by some content relating to the question. The question from the voice-controlled device 106 may be prompted based at least in part on other statements and/or questions from the user 112, e.g., following the conversation 302. In any event, in response to the question from the voice-controlled device 106, the user 112 may answer (e.g., "I don't like Kenny G."). This may be relevant as the playlist playing on the voice-controlled device 106 may include a song by Kenny G.

The process 404 may be performed by the CSM engine 104. The process 404 may begin at 406 by beginning to play a playlist and prompting a user. This may be performed by the voice interface component 202 (FIG. 2). In some examples, playing the playlist and prompting the user 112 may be represented by the conversation 402.

At 408, the process 404 may include receiving voice data. This may be performed by the voice interface component 202. Receiving the voice data may include receiving the voice data as part of the conversation 402. For example, the voice data may include the statement "I don't like Kenny G" from the user 112. This voice data may be received responsive to block 406.

At 410, the process 404 may include generating a search constraint, e.g., the search constraint 306b. This may be performed by the constraint determination component 204 (FIG. 2). Generating the search constraint may include generating the search constraint based at least in part on the voice data obtained during the conversation 402. The voice data, in this example, indicates that the user 112 does not like Kenny G. Thus, generating the search constraint may include generating the search constraint to represent this fact. For example, the search constraint 306b states that the Artist IS NOT Kenny G, e.g., artist !=Kenny G. The search constraint 306b, if used to search a database, would not return results tagged with metadata that identifies Kenny Gas the artist.

At 412, the process 404 may include associating properties 308 with the search constraint 306b. This may be performed by the constraint determination component 204. The properties 308 relevant to this search constraint 306b include a selective property 308s and the direct property 308d.

The selective property 308s indicates that this search constraint 308b is likely to return selective results, e.g., results that are likely to meet the user's goal. The direct property 308d was discussed previously.

Figure 5:
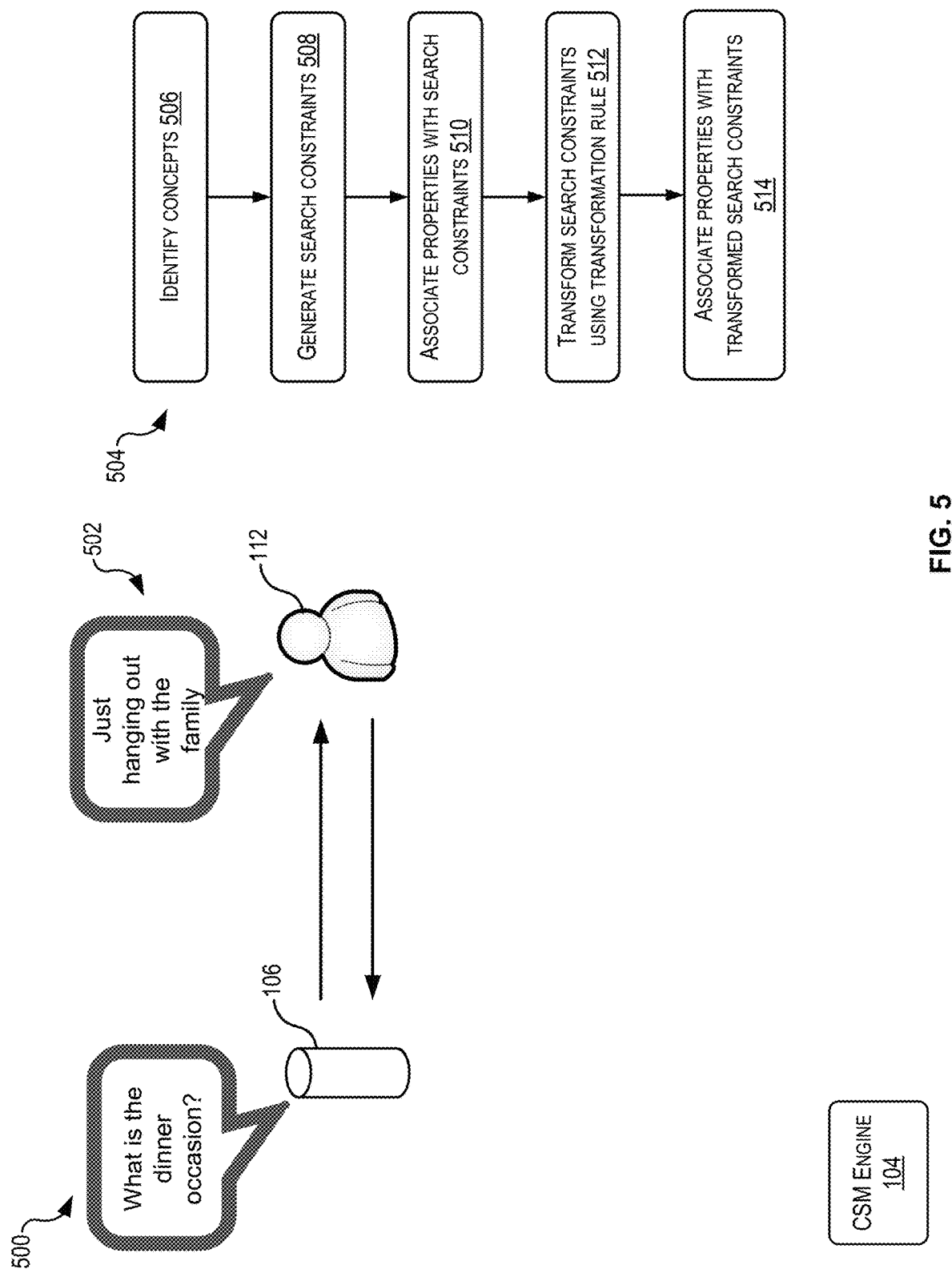
FIG. 5 is an example diagram illustrating a first aspect of conversational search management relating to determining search constraints, according to at least one example.
Figure 6:
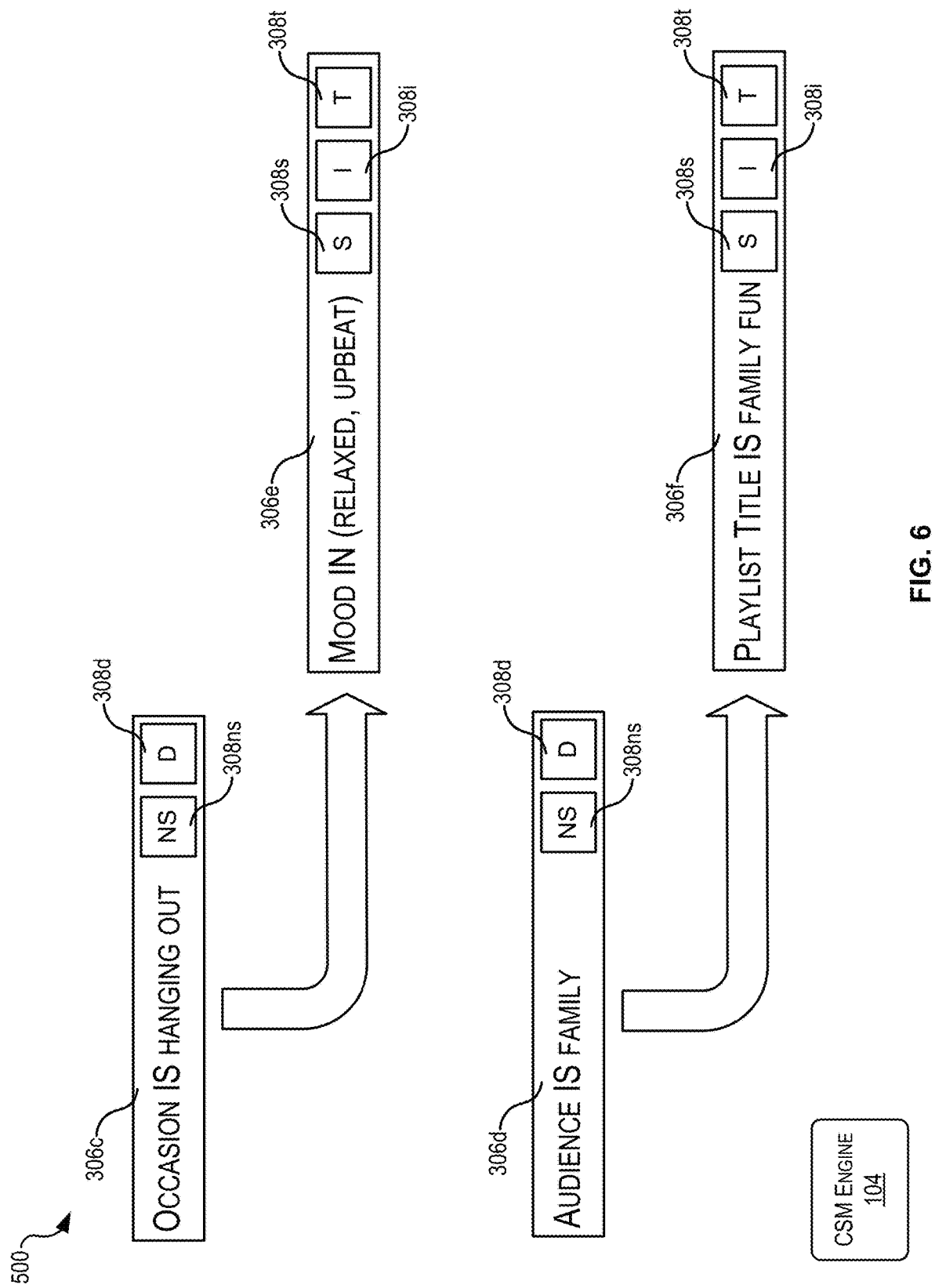
FIG. 6 is an example diagram illustrating a second aspect of conversational search management relating to determining search constraints as illustrated in FIG. 5, according to at least one example.

FIGS. 5 and 6 include example diagram 500 illustrating an aspect of conversational search management relating to determining search constraints, according to at least one example. In particular, in FIG. 5, the diagram 500 depicts a conversation 502 and a flowchart showing a process 504 relating to determining search constraints. In FIG. 6, the diagram 500 depicts an example search constraint constraints 306c-306f generated by the process 504 based at least in part on the conversation 502.

The conversation 502, which may be a current conversation or a past conversation, may include a question from the voice-controlled device 106 (e.g., "What is the dinner occasion?"). The question from the voice-controlled device 106 may be prompted based at least in part on other statements and/or questions from the user 112, e.g., following the conversation 302 or the conversation 402. In some examples, the conversation 502 is part of its own session. In any event, in response to the question from the voice-controlled device 106, the user 112 may answer (e.g., "Just hanging out with my family."). The process 504 may be performed to take this answer and convert it to a set of search constraints that can be used to find a relevant search result for the user 112, even though the user 112 has not provided a specific instruction.

The process 504 may be performed by the CSM engine 104.

The process 504 may begin at 506 by identifying concepts based at least in part on the conversation 502, which includes voice data. This may be performed by the constraint determination component 204 (FIG. 2). The concepts may be identified based at least in part on a predefined set of rules that list concepts. The concepts, in this example, may include "hanging out" and "with the family." These phrases, which could also be one word, are considered concepts because they are likely to narrow a set of search results when converted to search constraints.

At 508, the process 504 may include generating search constraints such as search constraints 308c and 308d, as illustrated in FIG. 6. This may performed by the constraint determination component 204. Generating the search constraints may include generating a search constraint for each of the concepts identified from the conversation 502 based at least in part on the voice data obtained during the conversation 502. The voice data, in this example, indicates that the user 112 is going to be hanging out with the family. Thus, generating the search constraint may include generating the search constraint to represent these concepts. For example, the search constraint 306c states that the Occasion IS hanging out, e.g., occasion=hanging out, and the search constraint 306d states that the Audience IS family, e.g., audience=family.

At 510, the process 504 may include associating properties 308 with the search constraints 306c and 306d. This may be performed by the constraint determination component 204. The properties 308 relevant to this search constraint 306c include a non-searchable property 308ns and the direct property 308d. Similar properties are relevant to the search constraint 306d. The non-searchable property 308ns indicates that the concept or concept with its particular value does not map to the underlying database or full text index schema and cannot be transformed into one that does map. This may be because the database to be searched does not include metadata fields that map to the either the parameter (e.g., occasion and audience) or their respective values (e.g., hanging out and family). Because of this, the process 504 may continue to 512. By comparison, another property, although not represented by the current example, can be non-selective. A non-selective property is one that is unlikely to be discriminating enough by itself to serve up a high confidence result. For example, if a user indicates that she wants to listen to upbeat music (e.g., a non-selective property), the system could serve up upbeat rock, upbeat classical, upbeat country and the user possibly does not like classical or country.

At 512, the process 504 may transform the search constraints 306c and 306d using one or more transformation rules to define search constraints 306e and 306f. This may be performed by the constraint determination component 204. In some examples, the one or more transformation rules may define a mapping of search constraints having non-selective properties to search constraints having selective or unselective properties. For example, the search constraint 306c may be transformed to the search constraint 306e (e.g., "Occasion IS hanging out" transformed to "Mood IN (relaxed, upbeat)"). This may be because a transformation rule defines that "hanging out" is a type of mood that could include relaxed music or upbeat music. The search constraint 306e is an example of a disjunctive expression supported by the techniques described herein. The search constraint 306d may be transformed to the search constraint 306f (e.g., "Audience IS family" transformed to "Playlist title IS family fun"). This may be because a transformation rule defines that a family audience may enjoy a playlist entitled "family fun."

At 514, the process 504 may include associating properties 308 with the search constraints 306e and 306f. This may be performed by the constraint determination component 204. The properties 308 relevant to search constraint 306e include a selective property 308s, an inferred property 308i, and a transformed property 308t. The inferred property 308i indicates that the search constraint 306e was inferred from data, such as voice data. This is because the user 112 did not actually say that she wanted relaxed or upbeat mood music. Instead, the system inferred this property based at least in part on the analysis performed previously. The transformed property 308t indicates that the search constraint 306e was transformed from a different search constraint, e.g., the search constraint 306c. The properties 308 relevant to search constraint 306f include the same set as discussed with reference to 306e, e.g., a selective property 308s, an inferred property 308i, and a transformed property 308t.

Figure 7:
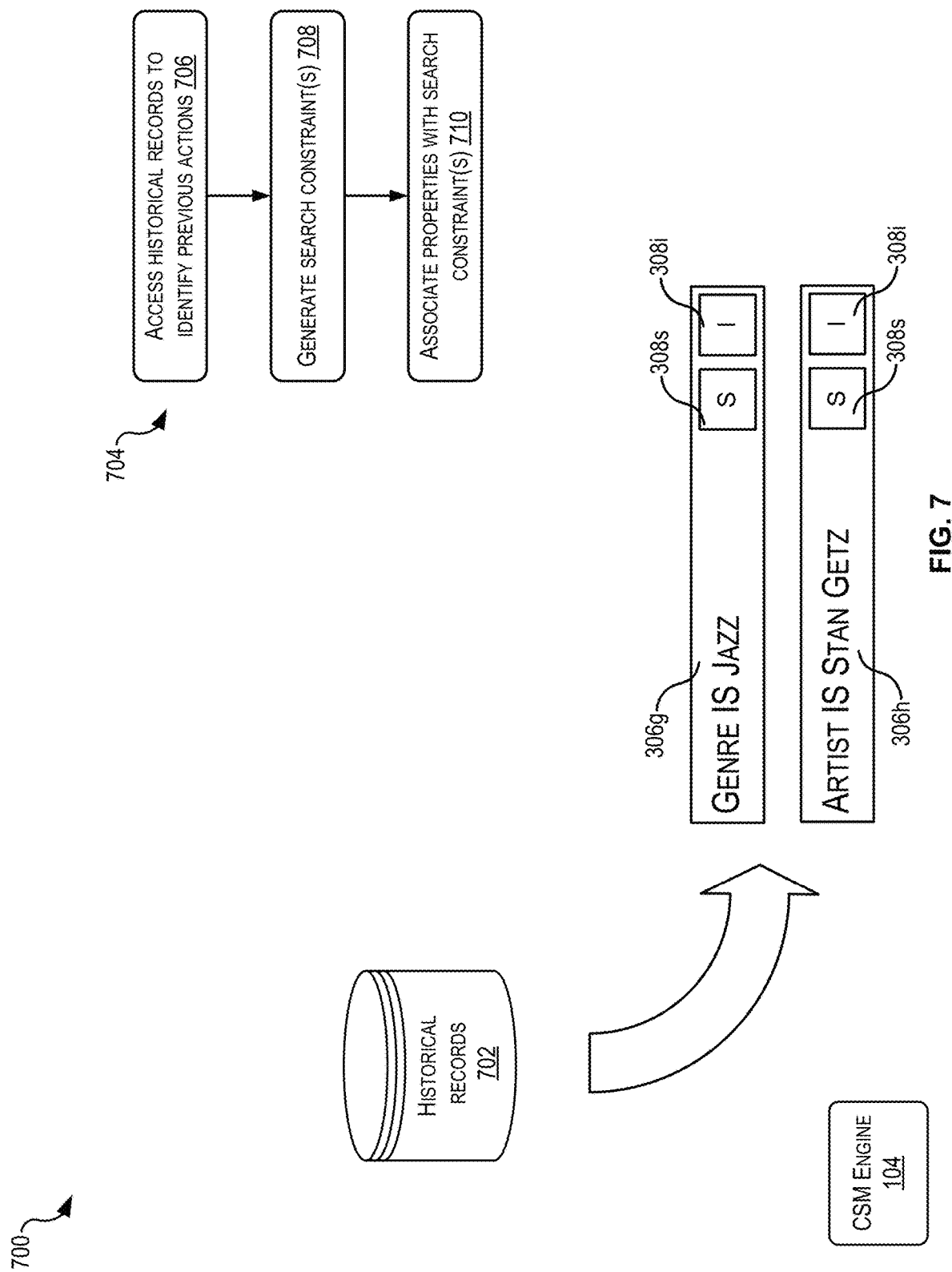
FIG. 7 is an example diagram illustrating an aspect of conversational search management relating to determining search constraints, according to at least one example.

FIG. 7 is an example diagram 700 illustrating an aspect of conversational search management relating to determining search constraints, according to at least one example. In particular, the diagram 700 depicts historical records database 702, a flowchart showing a process 704 relating to determining search constraints, and example search constraints 306g and 306h generated by the process 704 based at least in part on information from the historical record database 702.

The historical records database 702 may include information about previous actions performed by a user, e.g., the user 112, and information about previous conversations with the user. When the CSM engine 104 is applied to music recommendations, the information about the previous actions can include listening history (e.g., songs, artists, playlists, albums, genres, moods, and the like), viewing history (e.g., items viewed but perhaps not listened to), emphasized content items (e.g., "liked" content items), deemphasized content items (e.g., "disliked" content items), user-prepared playlists, user-provided preferences (e.g., survey results that indicate the type of music the user likes), and other similar information. The information about the previous conversations can include tagged data of prompts and responses. In some examples, the previous actions and/or the previous conversation data is used to create a set of historical search constraints prior to a search session, e.g., in connection with a current conversation, as described herein. In some examples, all of the historical search constraints are used to determine the set of search queries. In other examples, only some or even none of the historical search constraints are used to determine the set of search queries.

In some examples, the information in the historical records database 702 is saved in association with a user account associated with a user profile of the user 112. In this manner, as part of identifying a user goal, the historical records database 702 can be accessed to obtain historical information that is relevant to the user 112.

The process 704 may be performed by the CSM engine 104. In some examples, the process 704 is performed in cases in which the historical search constraints have not been previously determined. Thus, in some examples, the process 704 is performed in a dynamic manner, e.g., responsive to voice data gathered during a current conversation. In this manner, the search constraints 306g and 306h may be determined dynamically. Once determined, the search constraints 306g and 306h and any other search constraints 306 described herein can be saved to an appropriate database for future use. In some examples, the database is the historical records database 702.

The process 704 may begin at 706 by accessing historical records to identify previous actions. This may include accessing the historical records database 702 to obtain historical actions. This may be performed by the constraint determination component 204 (FIG. 2). In some examples, the historical records database 702 is accessed using information about a user 112 participating in a current conversation.

At 708, the process 704 may include generating the search constraints (e.g., 306g and 306h) based at least in part on the historical data from the historical records database 702. This may be performed by the constraint determination component 204. The search constraints 306g and 306h may represent a listening history of the user 112. In particular, the search constraint 306g indicates that a Genre IS jazz (e.g., genre=jazz), and the search constraint 306g indicates that the Artist IS Stan Getz (e.g., artist=Stan Getz). Thus, in the past, the user 112 has listened the genre jazz and, in particular, the artist Stan Getz.

At 710, the process 704 may include associating properties 308 with the search constraints 306g and 306h. This may be performed by the constraint determination component 204. The properties 308 relevant to search constraint 306g include a selective property 308s and an inferred property 308i. The inferred property 308i indicates that the search constraint 306g was inferred from something other than a direct statement by the user 112 during a conversation. The properties 308 relevant to search constraint 306h include the same set as discussed with reference to 306g, e.g., a selective property 308s and an inferred property 308i.

Figure 8:
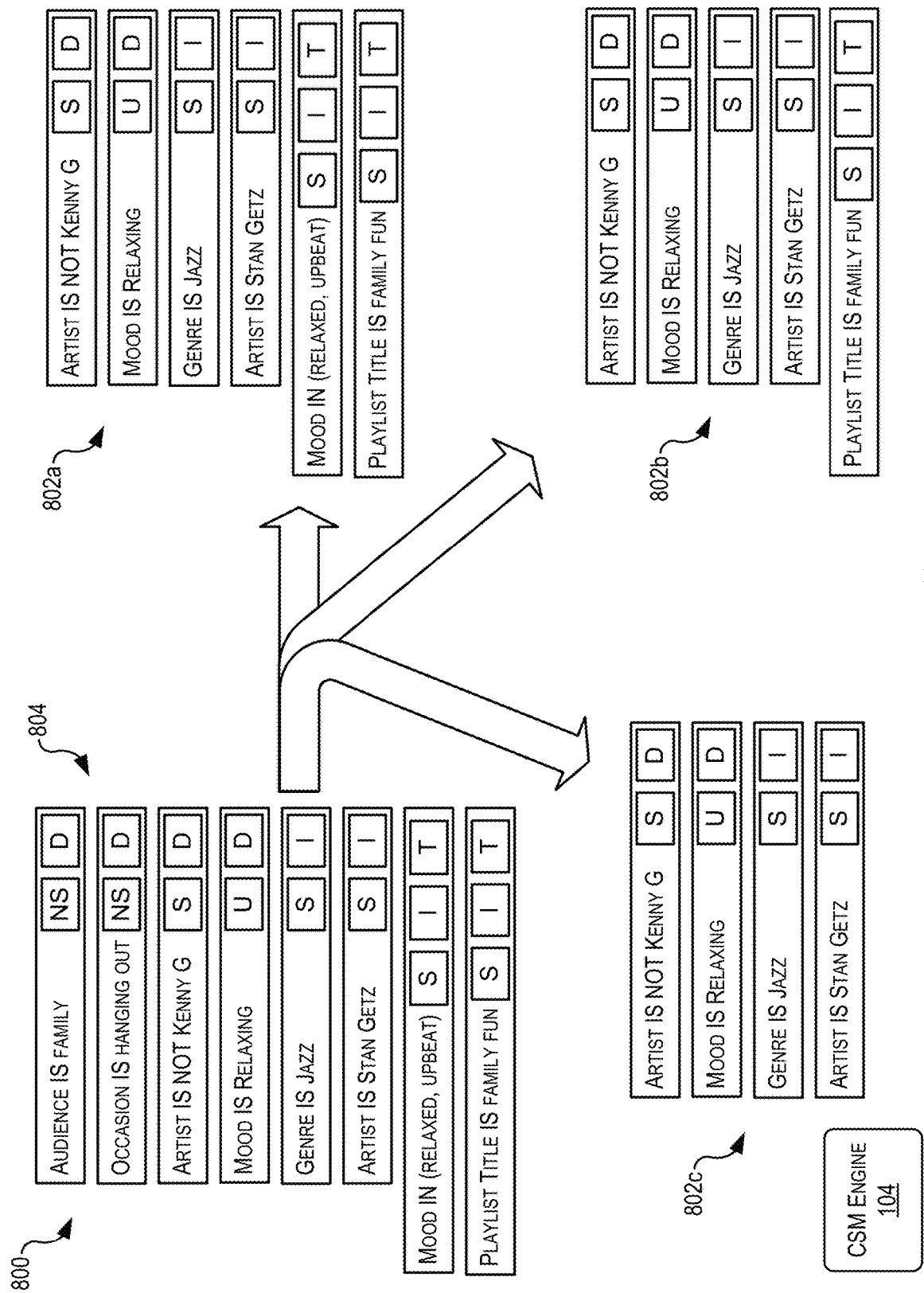
FIG. 8 is an example diagram illustrating an aspect of conversational search management relating to determining search query plans, according to at least one example.

FIG. 8 is an example diagram 800 illustrating an aspect of conversational search management relating to determining the search query plans 802, according to at least one example. In addition to the search query plans 802, the diagram 800 also includes a complete set of search constraints 804. The diagram 800 is used, at least in part, to show how search constraints from the complete set of search constraints 804 can be selectively removed from the complete set of search constraints 804 in order to define the search query plans 802. This process of selectively removing the search constraints may be performed by the query plan determination component 206 (FIG. 2).

The complete set of search constraints 804 includes each example search constraint discussed with reference to FIGS. 3-7. Of course, other search constraints can be added to the complete set of search constraints 804 and/or search constraints can be removed from the complete set of search constraints 804. The complete set of search constraints 804 is complete in the sense that it includes a sufficient number of search constraints to perform a meaningful search, e.g., a search that could return relevant or reasonable confidence results for the user. In other examples, the complete set of search constraints 804 may return no search results because the values of the constraints are too selective. As described herein, the search constraints included in the complete set of search constraints 804 have been generated based current conversations, past conversations, and past actions.

To determine the search query plans 802a-802c, the query plan determination component 206 can apply a set of filtering rules to the complete set of search constraints 804. The set of filtering rules can be heuristic based and, in some examples, may be generated and/or adjusted based at least in part on one or more predictive models (e.g., machine learning methods for learning which rules result in relevant query plans). This can include grouping certain types of constraints, removing conflicting constraints or other constraints, etc. Of the search query plans 802a-802c, some may be useful for returning relevant results and some may be less useful. The process of building the search query plans 802a-802c determines the composition of useful combinations of constraints.

In a particular example, a branch and bound approach for integer programming may be used to build the search query plans 802. The search may be formulated as a constrained optimization problem. In this example, violation of a constraint incurs a penalty. Penalties may be defined in one or more of the following ways: (i) domain knowledge: how strongly to enforce a specific type of constraint genre, artist, explicit, etc. (ii) tuned from feedback: based on playback, survey results or verbal feedback, the cost of violating a particular constraint is inferred (this may be personalized to users), and (iii) memory-based: higher penalties for constraints repeated over interactions. Choosing which node to evaluate may include a number of options. For example, a first option may include choosing the query plan which incurs the least penalty while remaining feasible (e.g., evaluating the tightest constraints first, but relaxing the order in which constraints are chosen apriori). Another option can include order constraints by penalty. This can include doing a depth first search in post-order. When an empty result set is found (e.g., infeasible constraints), the system can backtrack and relax the last added constraint. In additional examples, the penalty associated with a node may represent the lower bound of the cost. In this example, each result retrieved can be associated with a reward that offsets the cost of violating the penalty. The search problem can be represented a binary tree. In this example, each node can represent a constraint, with a first branch arising from a node that represents a constraint that is enforced and a second branch arising from a node that represents a constraint that is relaxed.

To build the search query plan 802a, search constraints that include NS, i.e., non-selective, properties have been removed from the complete set of search constraints 804. The search query plan 802a likely has the narrowest search scope of the three search query plans 802 and will, therefore, likely return the smallest (e.g., most specific) set of search results.

To build the search query plan 802b, the search query plan 802a has been modified by removing an additional search constraint associated with the mood of the music. This results in the search query plan 802b including fewer search constraints than the search query plan 802a. As a result, the search query plan 802b likely has a broader search scope than the search query plan 802b and will, therefore, likely return a larger number (e.g., less specific) set of search results.

To build the search query plan 802c, the search query plan 802b has been modified by removing an additional search constraint associated with the playlist title. This results in the search query plan 802c that includes fewer search constraints than the search query plans 802a and 802b. As a result, the search query plan 802c likely has the broadest scope of the three search query plans 802 and will, therefore, likely return the largest (e.g., least specific) set of search results.

In some examples, each search query plan 802 is determined in series by the query plan determination component 206 and executed in series by the query plan execution component 208 (FIG. 2). For example, the search query plan 802a can be determined and executed before generating and executing search query plans 802b and 802c. In some examples, this may conserve processing resources and result in bandwidth savings because the search query plans 802 are only determined if searches will actually be performed.

In some examples, all search query plans 802 are determined in series before being executed in series. For example, the search query plans 802a-802c may be determined as part of one process. Once all three search query plans 802a-802c has been completed, the search query plan 802a may be executed, followed by search query plans 802b and 802c.

In some examples, the search query plans 802 are determined in parallel, in series, or in some combination of series and parallel. For example, the search query plans 802 can be executed in parallel. It may be desirable to execute all of the search query plans 802 at about the same time (e.g., within seconds or less of each other) so that the results of the search query plans 802 (e.g., sets of electronic content items) can be compared to determine which is most appropriate to be shared with the user by the voice interface component 202.

In some examples, determining which search query plan 802 to execute initially or determining which results of a search query plan 802 to present initially to the user may be based at least in part on a ranking of the search query plans 802. The ranking may represent any suitable order of the search query plans 802 with respect to some measure. Examples of such measures can include, for example, number and/or type of search constraints, number and/or type of search constraints having a particular property, number and/or type of properties present among all search constraints, a search query plan relevancy score (e.g., generated based at least in part on the search constraints, corresponding properties, and voice data associated with the current conversation), and any other suitable measure.

In some examples, determining which results are appropriate may include determining which is most relevant to an explicit or inferred user goal. The explicit or inferred goal may be determined from the voice data associated with the current conversation. In some examples, each of the search query plans 802 can include a score that represents a relevancy to the explicit or inferred user goal. In this example, selecting which search query plan 802 to execute initially may be based at least in part on the relevancy scores.

Figure 9:
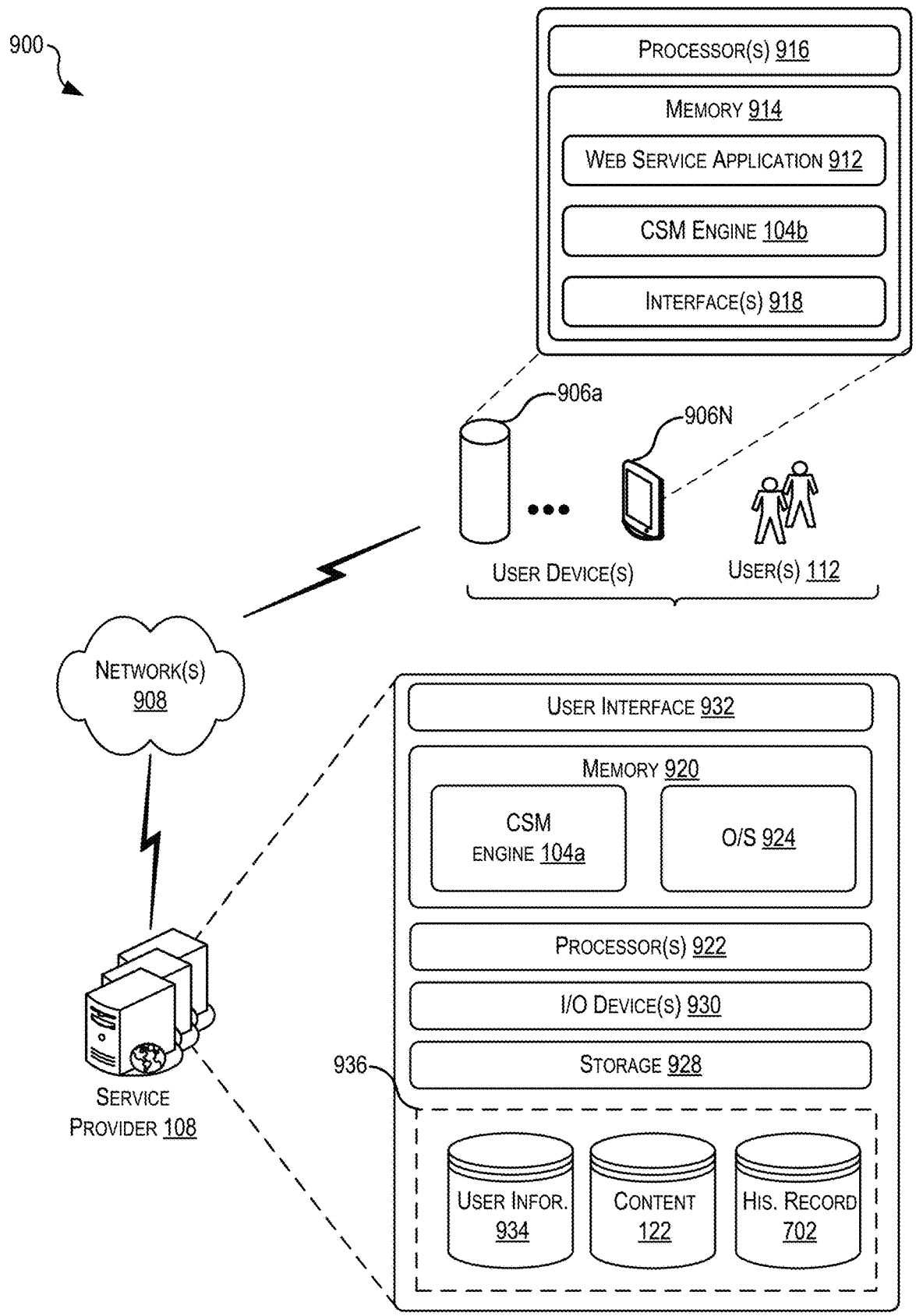
FIG. 9 is an example schematic architecture for implementing techniques relating to conversational search management, according to at least one example.

FIG. 9 is an example schematic architecture 900 for implementing techniques relating to conversational search management, according to at least one example. The architecture 900 may include the service provider 108 in communication with one or more user devices 906a-906N via one or more networks 908 (hereinafter, "the network 908").

The user device 906, which is an example of the voice-controlled device 106, may be operable by one or more users 112 to interact with the service provider 108. The user device 906 may be any suitable type of computing device such as, but not limited to, a wearable device, voice-controlled device (e.g., a smart speaker), a tablet, a mobile phone, a smart phone, a network-enabled streaming device (a high-definition multimedia interface ("HDMI") microconsole pluggable device), a personal digital assistant ("PDA"), a laptop computer, a desktop computer, a thin-client device, a tablet computer, a high-definition television, a web-enabled high-definition television, a set-top box, etc. For example, the user device 906a is illustrated as an example of voice-controlled user device, while the user device 906N is illustrated as an example of a handheld mobile device. In some example, the user device 906a may be connected to a voice-controlled intelligent personal assistant services. The user device 906a may respond to some predefined "wake word" such as "computer." In some examples, the user device 906a is capable of voice interaction, music playback, making to-do lists, setting alarms, streaming podcasts, playing audiobooks, and providing weather, traffic and other real-time information. In some examples, the user device 906a can also control several smart devices acting as a home automation hub. In some examples, electronic content items are streamed from the service provider 108 via the network 908 to the user device 906.

The user device 906 may include a memory 914 and processor(s) 916. In the memory 914 may be stored program instructions that are loadable and executable on the processor(s) 916, as well as data generated during the execution of these programs. Depending on the configuration and type of user device 906, the memory 914 may be volatile (such as random access memory ("RAM")) and/or non-volatile (such as read-only memory (ROM), flash memory, etc.).

In some examples, the memory 914 may include a web service application 912 and a CSM engine 104b. The web service application 912 and/or the CSM engine 104a may allow the user 112 to interact with the service provider 108 via the network 908. Such interactions may include, for example, creating, updating, and managing user preferences associated with the user 112, any one of the user devices 906, and/or streaming content. For example, the user 112 may identify what types of content she finds interesting. The memory 914 also includes one or more user interfaces 918. The interfaces 918 may enable user interaction with the user device 906. For example, the interfaces 918 can include a voice interface to receive voice instructions and output verbal information (e.g., play streaming or stored content items), prompts for information, and other requested information.

Turning now to the details of the service provider 108, the service provider 108 may include one or more service provider computers, perhaps arranged in a cluster of servers or as a server farm, and may host web service applications. The function of the service provider 108 may be implemented a cloud-based environment such that individual components of the service provider 108 are virtual resources in a distributed environment. The service provider 108 also may be implemented as part of an electronic marketplace (not shown). In some examples, the service provider 108 may be configured to provide digital content streams to the user devices 906.

The service provider 108 may include at least one memory 920 and one or more processing units (or processor(s)) 922. The processor 922 may be implemented as appropriate in hardware, computer-executable instructions, software, firmware, or combinations thereof. Computer-executable instruction, software, or firmware implementations of the processor 922 may include computer-executable or machine-executable instructions written in any suitable programming language to perform the various functions described. The memory 920 may include more than one memory and may be distributed throughout the service provider 108. The memory 920 may store program instructions that are loadable and executable on the processor(s) 922, as well as data generated during the execution of these programs. Depending on the configuration and type of memory including the service provider 108, the memory 920 may be volatile (such as RAM and/or non-volatile (such as read-only memory ("ROM"), flash memory, or other memory). The memory 920 may include an operating system 924 and one or more application programs, modules, or services for implementing the features disclosed herein including at least the CSM engine 104a.

The service provider 108 may also include additional storage 928, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 928, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components, may refer to programming modules executed by computing systems (e.g., processors) that are part of the service provider 108 and/or part of the user device 906.

The service provider 108 may also include input/output (I/O) device(s) and/or ports 930, such as for enabling connection with a keyboard, a mouse, a pen, a voice input device, a touch input device, a display, speakers, a printer, or other I/O device.

In some examples, the service provider 108 may also include one or more user interface(s) 932. The user interface 932 may be utilized by an operator, curator, or other authorized user to access portions of the service provider 108. In some examples, the user interface 932 may include a graphical user interface, voice interfaces, web-based applications, programmatic interfaces such as APIs, or other user interface configurations. The service provider 108 may also include the datastore 936. In some examples, the datastore 936 may include one or more databases, data structures, or the like for storing and/or retaining information associated with the service provider 108. Thus, the datastore 936 may include data structures, such as a user information database 934, the content item database 122, and the historical record database 702.

The user information database 934 may be used to retain information pertaining to users of the service provider 108 such as the user 112. Such information may include, for example, user preferences, user account information (e.g., electronic profiles for individual users), demographic information for users, payment instrument information for users (e.g., credit card, debit cards, bank account information, and other similar payment processing instruments), account preferences for users, purchase history of users, wish-lists of users, search histories for users, and other similar information pertaining to a particular user, and sets of users, of the service provider 108.

In some examples, the user preferences stored in the user information database 234 may be specific to particular user devices, to particular users, or to any combination of the foregoing. For example, the user 112 may be associated with a plurality of user devices of the user devices 906-906N. In this example, the user 112 may be a master user and may create specific user preferences for each of the plurality of user devices 906 such that each of the plurality of user devices 906 are operable in accordance with its respective user preferences, which may be identified based at least in part on a user profile of the user 112. In this manner, the user preference may be fixed to the user device 906, irrespective of which user is accessing the user device 906. In some examples, the user 112 may set up master user preferences, which may be the default user preference when a new user device is associated with the user. This configuration for managing user preferences may be desirable when the master user is a parent and at least some of the user devices 106 that are associated with the master user are used by children of the master user.

In some examples, each of the users 112 may have their own user preferences (e.g., as part of a user profile) that may be portable between any of the user devices 906. Such user preferences may be associated with a particular user device 906 after the user 112 logs in to the user device 906 (e.g., logs into the CSM engine 104) using user credentials. This configuration for managing user preferences may be desirable when each of the users 112 is capable of managing its own user preferences.

The content item database 122 may include an expansive collection of digital content (e.g., music, videos, etc.) that is available for streaming and/or for downloading. The content item database 1212 may be searchable by the user device 906 using any suitable technique including those described herein. In some examples, the organization of data from the content item database 122 may be represented by one or more search indices. In some examples, the content item database 122 includes a plurality of searchable fields for each content item stored in the content item database 122. Such fields may be specific to the type of content item, with at least some fields being generic across types. For example, for a music file, such data fields may include header, title, artist, album, year, comment, zero byte, track number, start-time, end-time, and genre. In some examples, the values in the metadata fields may be represented by numerical codes. For example, the genre values may be represented by one number of around 200 possible numbers.

The historical record database 702 may include information about historical actions and/or historical search constraints. After a search constraint has been generated for a current conversation, the search constraint can be saved in the historical record database 702 in associate with the user account.

Figure 10:
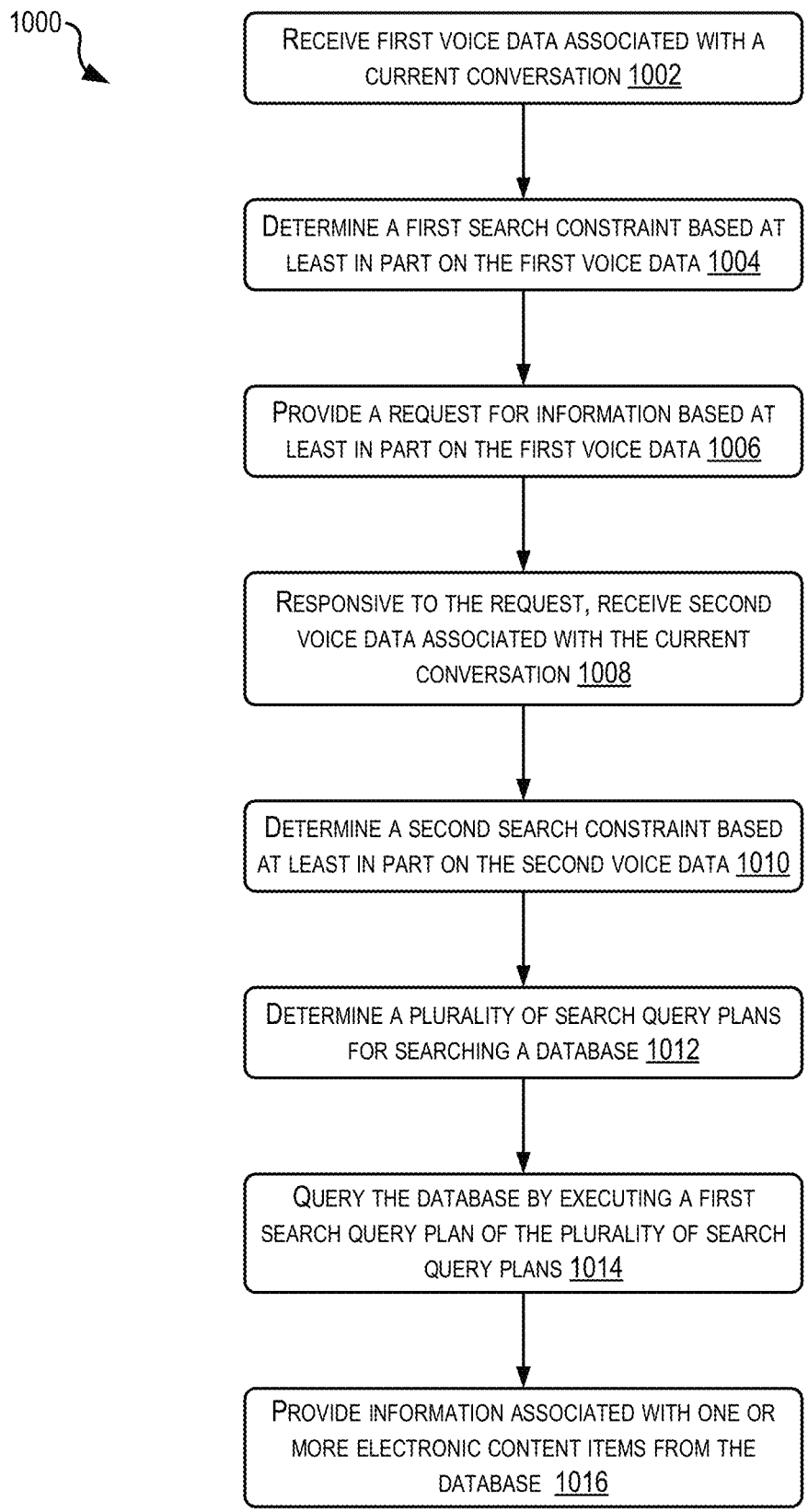
FIG. 10 is an example flow diagram depicting example acts for implementing techniques relating to conversational search management, according to at least one example.
Figure 11:
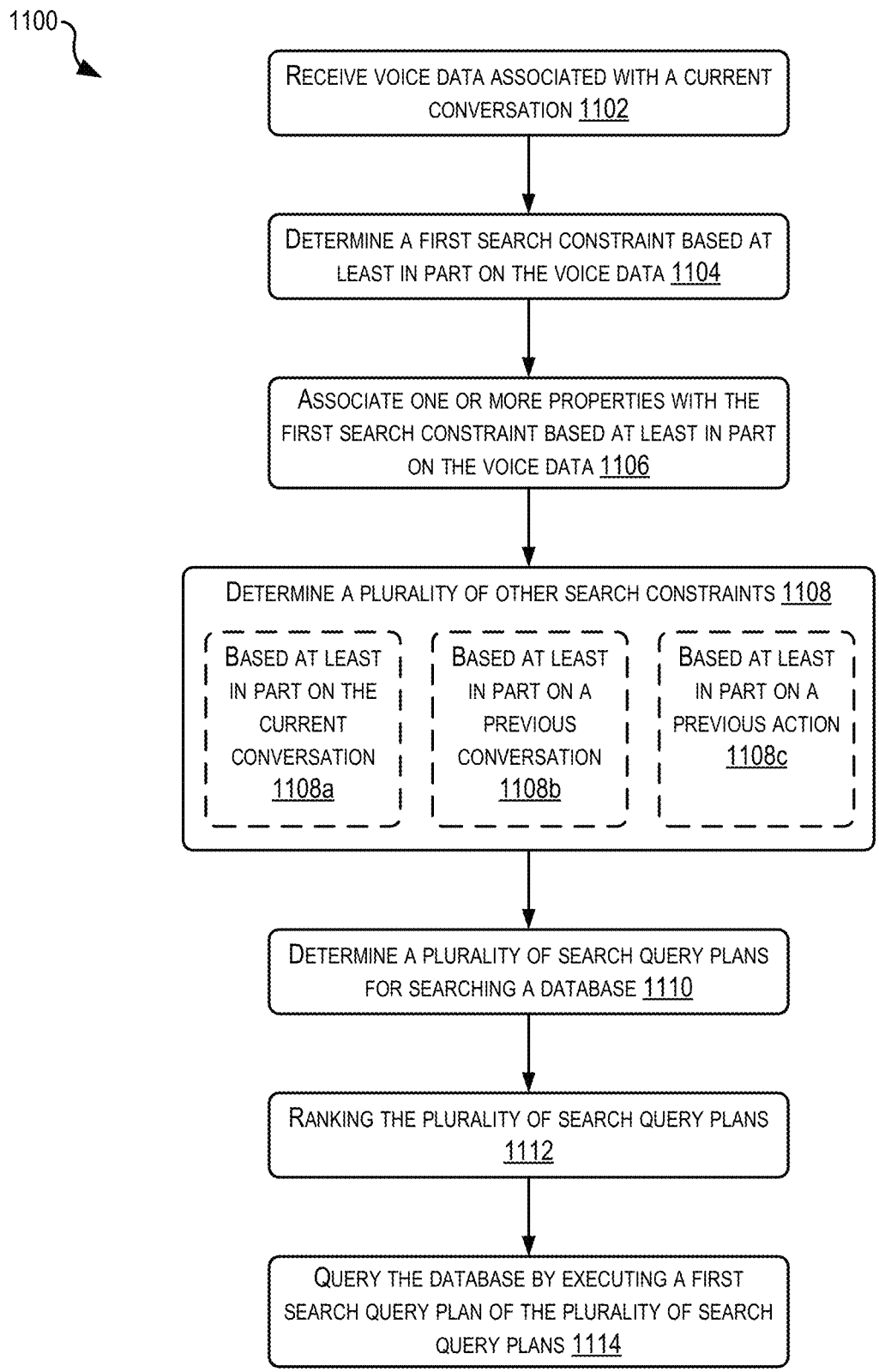
FIG. 11 is an example flow diagram depicting example acts for implementing techniques relating to conversational search management, according to at least one example.
Figure 12:
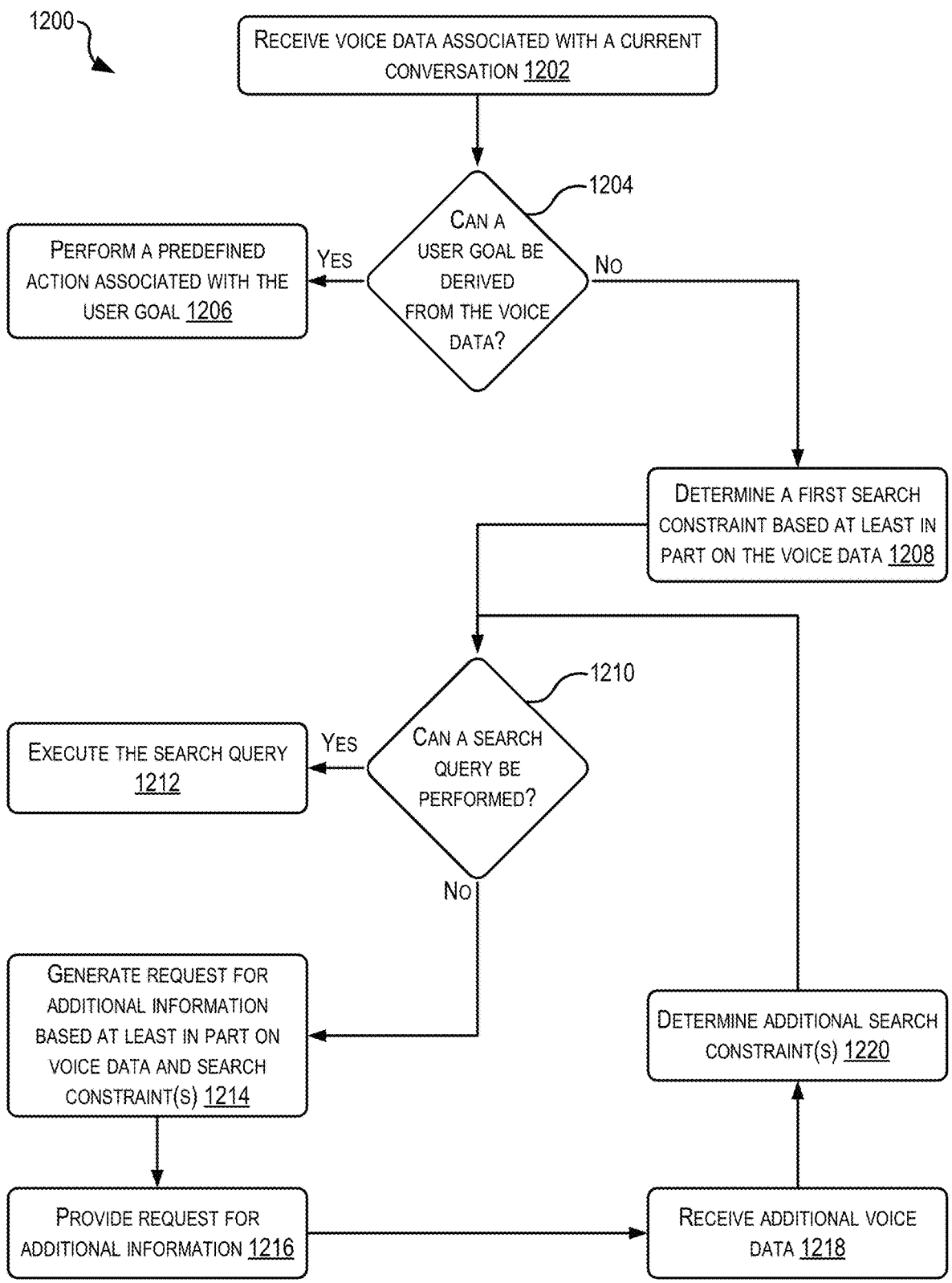
FIG. 12 is an example flow diagram depicting example acts for implementing techniques relating to conversational search management, according to at least one example.

FIGS. 10, 11, and 12 illustrate example flow diagrams showing respective processes 1000, 1100, and 1200, as described herein. These processes 1000, 1100, and 1200 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 10 is flow diagram of process 1000 depicting example acts for implementing techniques relating to conversational search management, according to at least one example. The CSM engine 104 embodied in the service provider 108 (FIG. 1) may perform the process 1000. In some examples, the CSM engine 104 embodied in the user device 906 (FIG. 9) or distributed among the service provider 108 and the user device 906 may perform the process 1000 of FIG. 10.

The process 1000 may begin at 1002 by receiving first voice data associated with a current conversation. This may be performed by the voice interface component 202 (FIG. 2) of the CSM engine 104 (FIG. 1). In some examples, the first voice data is received via a voice interface of a voice-controlled device. The current conversation may be associated with some topic such as music. For example, the first voice data may be provided by a user in response music played by the voice-controlled device.

At 1004, the process 1000 may include determining a first search constraint based at least in part on the first voice data. This may be performed by the constraint determination component 204 (FIG. 2) of the CSM engine 104. The first search constraint may include first one or more properties. The first one or more properties may be indicative of the conditions under which the first search constraint was determined and other aspects of the first search constraint.

In some examples, the first search constraint may include a music constraint, an occasion constraint, an audience constraint, a mood constraint, a genre constraint, a playlist constraint, an album constraint, a song constraint, an artist constraint, a genre constraint, an era constraint, a tempo constraint. and any other constraint. The constraint can be positive (e.g., include music from a particular genre) or negative (e.g., exclude music from the particular genre).

At 1006, the process 1000 may include providing a request for information based at least in part on the first voice data. This may be performed by the voice interface component 202 of the CSM engine 104. In some examples, the request for information is received via the voice interface of the voice-controlled device. The request for information may be generated to obtain additional data that can be used to determine additional search constraints.

At 1008, the process 1000 may include responsive to the request for information, receiving second voice data associated with the current conversation. This may be performed by the voice interface component 202 of the CSM engine 104. In some examples, the request for information is received via the voice interface of the voice-controlled device.

At 1010, the process 1000 may include determining a second search constraint based at least in part on the second voice data. This may be performed by the constraint determination component 204 of the CSM engine 104. In some examples, the second search constraint may include second one or more properties.

At 1012, the process 1000 may include determining a plurality of search query plans for searching a database. This may be performed by the query plan determination component 206 (FIG. 2) of the CSM engine 104. In some examples, determining the plurality of search query plans may be based at least in part on the first search constraint, the second search constraint, and other search constraints. The other search constraints can be determined based at least in part on past actions, past conversations, and/or the current conversation. In some examples, individual search query plans may include unique combinations of one or more search constraints selected from the first search constraint, the second search constraint, and other search constraints. The database may include a plurality of electronic content items.

In some examples, the process 1000 may include ranking the plurality of search query plans. The first search query plan may be a highest ranked search query plan.

In some examples, determining the plurality of search query plans may include applying a set of filtering rules to define the plurality of search query plans by selectively removing individual search constraints from a complete set of search constraints including the first search constraint, the second search constraint, and the other search constraints.

At 1014, the process 1000 may include querying the database by executing a first search query plan of the plurality of search query plans. This may be performed by the query plan execution component 208 (FIG. 2) of the CSM engine 104. Executing the first search query plan may include using the search constraints associated with the first search query plan to search an index of the database.

At 1016, the process 1000 may include providing information associated with one or more electronic content items of the plurality of electronic content items from the database. This may be performed by the voice interface component 202 of the CSM engine 104. In some examples, the plurality of electronic content items are those identified during executing the first search query plan. In some examples, the information includes a music playlist.

FIG. 11 is flow diagram of process 1100 depicting example acts for implementing techniques relating to conversational search management, according to at least one example. The CSM engine 104 embodied in the service provider 108 (FIG. 1) may perform the process 1100. In some examples, the CSM engine 104 embodied in the user device 906 (FIG. 9) or distributed among the service provider 108 and the user device 906 may perform the process 1100 of FIG. 11.

The process 1100 may begin at 1102 by receiving voice data associated with a current conversation. This may be performed by the voice interface component 202 (FIG. 2) of the CSM engine 104 (FIG. 1). The voice data may be of a user, and the conversation may be between the user and a local user device. The local user device may be configured to collect the voice data and provide it to a service provider for processing. In some examples, receiving the voice data includes receiving the voice data via a voice interface of a voice-controlled device.

At 1104, the process 1100 may include determining a first search constraint based at least in part on the voice data. This may be performed by the constraint determination component 205 (FIG. 2) of the CSM engine 104. Determining the first search constraint may include processing the voice data to identify one or more verbal concepts present in the voice data. In some examples, these verbal concepts can map directly to one or more search constraints and/or themselves may represent one or more search constraints.

At 1106, the process 1100 may include associating one or more properties with the first search constraint based at least in part on the voice data. This may be performed by the constraint determination component 205 of the CSM engine 104. Associating the properties may include identifying the properties based at least in part on the concepts from the voice data, the conditions under which the voice data was obtained, the conditions under which the first search constraint was determined, and how selective the first search constraint is.

At 1108, the process 1100 may include determining a plurality of other search constraints. This may be performed by the constraint determination component 205 of the CSM engine 104. Generating the other search constraints may be desirable to further define the searching query plans to be determined later.

At 1108a, the process 1100 may include determining the plurality of other search constraints based at least in part on the current conversation. In this example, the current conversation may include a set of requests for information output via the voice interface of a voice-controlled device during a time period and a set of corresponding answers received via the voice interface during the time period. In some examples, determining the plurality of other search constraints based at least in part on the current conversation may include providing a request for information based at least in part on the first voice data, responsive to the request for information, receiving second voice data associated with the current conversation, and determining the plurality of search constraints based at least in part on the second voice data.

At 1108*b*, the process 1100 may include determining the plurality of other search constraints based at least in part on a past conversation. In this example, the voice data is associated with a user of a user account. Determining the plurality of other search constraints based at least in part on the past conversation may include accessing the plurality of other search constraints from an electronic record associated with the user account. In this example, the past conversation may have occurred prior to the current conversation such that the past conversation was part of a different session occurring at a different time period.

At 1108*c*, the process 1100 may include determining the plurality of other search constraints based at least in part on a previous action. In this example, the voice data is associated with a user of a user account. Determining the plurality of other search constraints based at least in part on the previous action may include accessing listening history from an electronic record associated with the user account, and determining the plurality of other search constraints based at least in part on the listening history.

At 1110, the process 1100 may include determining a plurality of search query plans for searching a database. This may be performed by the query plan determination component 206 (FIG. 2) of the CSM engine 104. In some examples, determining the plurality of search query plans may be based at least in part on the first search constraint and the other search constraints. Individual search query plans may include unique combinations of search constraints selected from a set of search constraints including the first search constraint and the other search constraints.

In some examples, the set of search constraints is a complete set of search constraints. In this example, determining the plurality of search query plans may include selectively grouping, in accordance with a set of filtering rules, unique combinations of individual search constraints from the complete set of search constraints to define the plurality of search query plans.

At 1112, the process 1100 may include ranking the plurality of search query plans. This may be performed by the query plan determination component 206 of the CSM engine 104. In some examples, ranking the plurality of search query plans may be performed using the techniques described herein.

At 1114, the process 1100 may include querying the database using a first search query plan of the plurality of search query plans. This may be performed by the query plan execution component 208 (FIG. 2) of the CSM engine 104. In some examples, querying the database may include using a set of search constraints associated with the first search query plan to search the database. In some examples, prior to querying the database using the first search query plan, the process 1100 may include selecting the first search query plan from the plurality of search query plans based at least in part on a ranked order of the plurality of search query plans.

In some examples, each search constraint of the plurality of other search constraints also includes one or more other properties. Each of the one or more properties of the first search constraint and each of the one or more other properties may include a selectivity property (e.g., selective, unselective, or not selective), a directness property (e.g., whether the constraint was directly obtained from a user conversation), an inferred property (e.g., whether the constraint was inferred from something a user said, from a user action, or from some other circumstance), a transformed property (e.g., whether the constraint was transformed from a different constraint), and any other suitable property. In some examples, the properties may be weighted individually and/or with respect to other properties associated with the constraint.

In some examples, the process 1100 may further include providing search results associated with the first search query plan, and responsive to providing the search results, receiving second voice data. In this example, the process 1100 may further include in accordance with a determination that the second voice data is indicative of a dislike of the search results, querying the database using a second search query plan of the plurality of search query plans.

FIG. 12 is flow diagram of process 1200 depicting example acts for implementing techniques relating to conversational search management, according to at least one example. The CSM engine 104 embodied in the service provider 108 (FIG. 1) may perform the process 1200. In some examples, the CSM engine 104 embodied in the user device 906 (FIG. 9) or distributed among the service provider 108 and the user device 906 may perform the process 1200 of FIG. 12.

The process 1200 may begin at 1202 by receiving voice data associated with a current conversation. This may be performed by the voice interface component 202 (FIG. 2) of the CSM engine 104 (FIG. 1). The voice data may be of a user, and the conversation may be between the user and a voice-controlled device.

At 1204, the process may include determining whether a user goal can be derived from the voice data. This may be performed by the voice interface component 202 of the CSM engine 104. In some examples, voice data may be sufficiently definite that the user goal can be derived from it. For example, if the voice data included a phrase such as "Play the song 'Friends in Low Places' by the artist 'Garth Brooks'," the system may confidently determine that the user goal is to play the song by the artist. Thus, the process 1200 may proceed to 1206, at which, the process 1200 may include performing the predefined action associated with the user goal. In this example, the predefined action may include playing the song. If, on the other hand, the user goal cannot be derived from the voice data, the process 1200 may proceed to 1208, at which, the process 1200 may include determining a first search constraint based at least in part on the voice data. This may be performed by the constraint determination component 204 (FIG. 2) of the CSM engine 104. The first search constraint may include one or more properties associated with the voice data.

At 1210, the process 1200 may include determining whether a search query can be performed. This may be performed by the query plan determination component 206 (FIG. 2) of the CSM engine 104. In some examples, this determination may be based at least in part on determining one or more search query plans for searching a database based at least in part on the first search constraint. Individual search query plans may include unique combinations of search constraints selected from a set of search constraints including the first search constraint. If the system is sufficiently confident (e.g., a confidence score exceeds a threshold) that using just the first search constraint in a single search query plan will return suitable results for the user, the determination at 1210 may be yes. For example, if the first search constraint is sufficiently definite, the system may proceed using just the first search constraint. In this example, the process 1200 may proceed to 1212, at which, the process 1200 may include executing the search query.

This may be performed by the query plan execution component 208 (FIG. 2). If, on the other hand, the determination at 1210 is no, the process 1200 may proceed to 1214.

At 1214, the process 1200 may include generating a request for additional information based at least in part on the voice data search constraint(s). This may be performed by the voice interface component 202 of the CSM engine 104. In some examples, the request may be tailored to obtain additional voice data that can be used to determine additional constraints. In this manner, the request for additional information may be considered a follow-up request that may be related to the earlier-received voice data and be part of the current conversation.

At 1216, the process 1200 may include providing the request for additional information. This may be performed by the voice interface component 202 of the CSM engine 104. The request for additional information may be provided via the voice interface in the form of a question.

At 1218, the process 1200 may include receiving additional voice data. This may be performed by the voice interface component 202 of the CSM engine 104.

At 1220, the process 1200 may include determining additional search constraint(s). This may be performed by the constraint determination component 204 of the CSM engine 104. In some examples, determining the additional search constraints may be based at least in part on the additional voice data.

After 1220, the process 1200 returns to 1210 to again make a determination of whether the search query can be performed. This includes updating the search query plans based at least in part on the additional search constraint(s).

Figure 13:
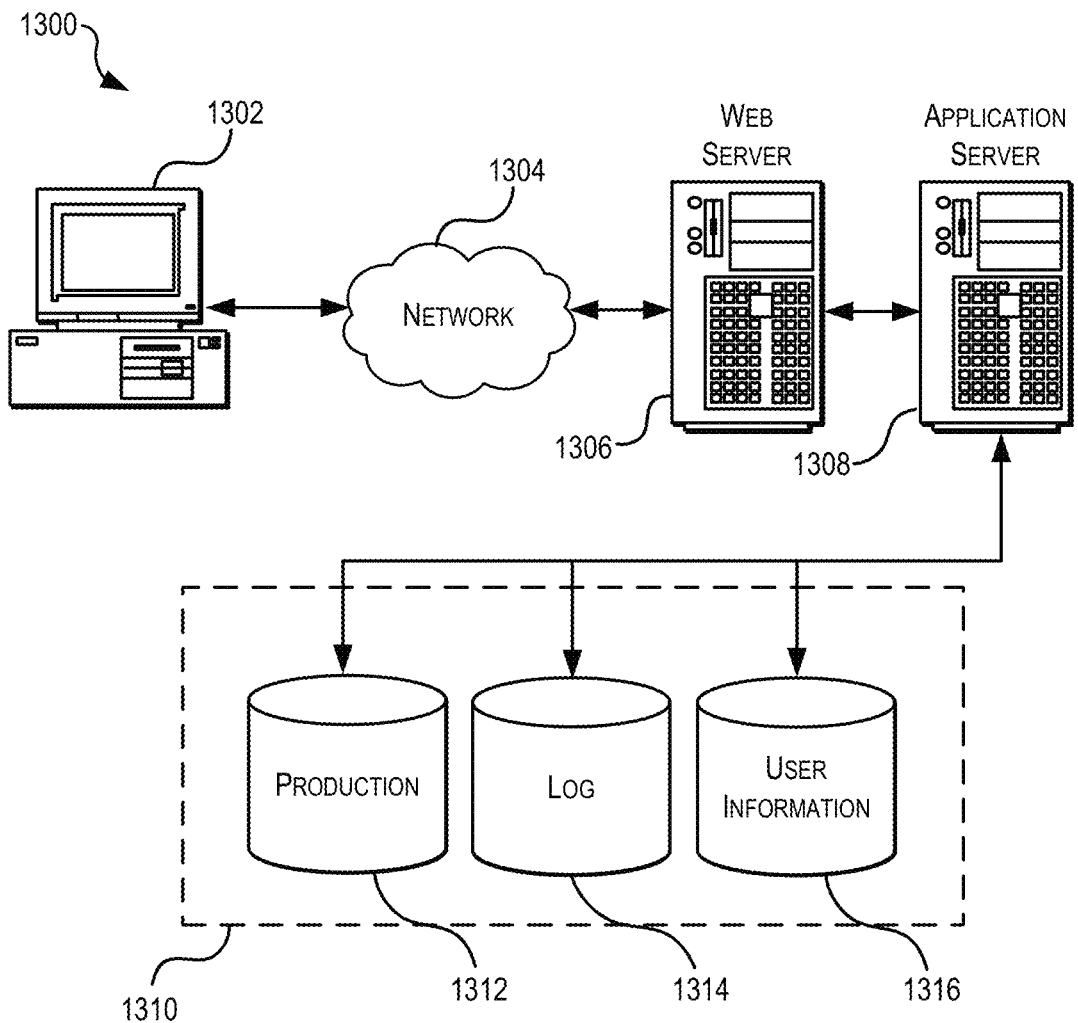
FIG. 13 is an example schematic environment for implementing techniques relating to conversational search management, according to at least one example.

FIG. 13 illustrates aspects of an example environment 1300 for implementing aspects in accordance with various examples. As will be appreciated, although a Web-based environment is used for purposes of explanation, different environments may be used, as appropriate, to implement various examples. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a memory configured to store computer-executable instructions; and
   a processor configured to access the memory and execute the computer-executable instructions to at least:
   receive, via a voice interface of a voice-controlled device, first voice data associated with a current conversation of a current search session comprising a plurality of exchanges between the voice-controlled device and a user, the current conversation relating to music;
   identify one or more concepts represented by the first voice data based at least in part on a set of concept rules;
   determine a first search constraint based at least in part on the first voice data;
   associate the first search constraint with first two or more search constraint properties based at least in part on the one or more concepts, the first two or more search constraint properties selected from a set of properties comprising a direct property representing that a respective search constraint was derived from a statement represented by the first voice data and maps directly to metadata associated with a set of electronic content items, an unselective property representing that a respective search constraint is narrowing and imprecise, a selective property representing that a respective search constraint is likely to return to search results that meet a goal of a requester, an inferred property representing that a respective search constraint was inferred from the first voice data, and a transformed property representing that a respective search constraint with a particular unselective property has been transformed to a different search constraint with a particular selective property, the first search constraint representative of at least one concept of the one or more concepts;
   provide, via the voice interface of the voice-controlled device, a request for information based at least in part on the first voice data, the request associated with the current conversation;
   responsive to the request for information, receive, via the voice interface of the voice-controlled device, second voice data associated with the current conversation;
   determine a second search constraint based at least in part on the second voice data, the second search constraint comprising second two or more search constraint properties selected from the set of properties;
   determine a plurality of search query plans for searching a database based at least in part on the first search constraint including the two or more search constraint properties, the second search constraint, and other search constraints, individual search query plans comprising unique combinations of one or more search constraints selected from the first search constraint, the second search constraint, and the other search constraints, and the database comprising a plurality of electronic content items;
   query the database by executing a first search query plan of the plurality of search query plans; and
   provide, via the voice interface of the voice-controlled device, information associated with one or more electronic content items of the plurality of electronic content items identified during executing the first search query plan.

2. The system of claim 1, wherein determining the plurality of search query plans comprising applying a set of filtering rules to define the plurality of search query plans by selectively removing individual search constraints from a complete set of search constraints comprising the first search constraint, the second search constraint, and the other search constraints.

3. The system of claim 1, wherein the memory comprises additional computer-executable instructions that, when executed by the processor, cause the processor to rank the plurality of search query plans, the first search query plan being a highest ranked search query plan.

4. A computer-implemented method, comprising:
   receiving voice data associated with a current conversation of a current search session comprising a plurality of exchanges between a voice-controlled device and a user;

identifying one or more concepts represented by the voice data based at least in part on a set of concept rules;

determining a search constraint based at least in part on the voice data, the search constraint representative of at least one concept of the one or more concepts;

associating two or more search constraint properties with the search constraint based at least in part on the voice data and the one or more concepts, the two or more search constraint properties selected from a set of properties comprising a direct property representing that a respective search constraint was derived from a statement represented by the voice data and maps directly to metadata associated with a set of electronic content items, an unselective property representing that a respective search constraint is narrowing and imprecise, a selective property representing that a respective search constraint is likely to return to search results that meet a goal of the user, an inferred property representing that a respective search constraint was inferred from the voice data, and a transformed property representing that a respective search constraint with a particular unselective property has been transformed to a different search constraint with a particular selective property;

determining a plurality of other search constraints based at least in part on one or more of the current conversation, a previous conversation, or a previous action;

determining a plurality of search query plans for searching a database based at least in part on the search constraint including the two or more search constraint properties and the other search constraints, individual search query plans comprising unique combinations of search constraints selected from a set of search constraints comprising the search constraint and the other search constraints; and querying the database using one or more search query plans of the plurality of search query plans.

5. The computer-implemented method of claim 4, further comprising providing search results based at least in part on querying the database using the one or more search query plans, the search results comprising an electronic content item or a prompt for obtaining additional voice data from the user.

6. The computer-implemented method of claim 4, wherein:

each search constraint of the plurality of other search constraints comprises two or more other properties; and each of the two or more other properties comprises a property selected from the set of properties.

7. The computer-implemented method of claim 4, wherein the current conversation of the current search session comprises:

providing a request for information based at least in part on the voice data; and responsive to the request for information, receiving subsequent voice data associated with the current conversation, and wherein determining the plurality of other search constraints comprises determining the plurality of other search constraints based at least in part on the subsequent voice data.

8. The computer-implemented method of claim 4, wherein:

the voice data is associated with a user account of the user; and determining the plurality of other search constraints based at least in part on the past conversation comprises accessing the plurality of other search constraints from an electronic record associated with the user account, the past conversation occurring prior to the current conversation.

9. The computer-implemented method of claim 4, wherein:

the voice data is associated with a user account of the user; and determining the plurality of other search constraints based at least in part on the previous action comprises:

accessing listening history from an electronic record associated with the user account; and determining the plurality of other search constraints based at least in part on the listening history.

10. The computer-implemented method of claim 4, further comprising:

providing search results based at least in part on querying the database using the one or more search query plans;

determining one or more alternative suggestions based at least in part on the search results; and providing information comprising a prompt for the user to select an alternative suggestion from the one or more alternative suggestions.

11. The computer-implemented method of claim 4, wherein:

the search constraint and the plurality of other search constraints define a complete set of search constraints; and determining the plurality of search query plans comprises selectively grouping, in accordance with a set of filtering rules, unique combinations of individual search constraints from the complete set of search constraints to define the plurality of search query plans.

12. The computer-implemented method of claim 4, further comprising, prior to querying the database using the one or more search query plans, selecting a first search query plan from the plurality of search query plans based at least in part on a ranked order of the plurality of search query plans.

13. The computer-implemented method of claim 4, further comprising:

providing search results associated with the one or more search query plans;

responsive to providing the search results, receiving subsequent voice data;

in accordance with a determination that the subsequent voice data is indicative of a dislike of the search results or that querying the database using the one or more search query plans returns no results; and querying the database using a second search query plan of the plurality of search query plans.

14. One or more non-transitory computer-readable media comprising computer-executable instructions that, when executed by one or more computer systems, cause the one or more computer systems to perform operations comprising:

receiving, via a voice interface of a voice-controlled device, voice data associated with a current search session of a current conversation between a user and the voice-controlled device, the current conversation comprising a plurality of exchanges between the voice-controlled device and the user;

determining whether a user goal can be derived from the voice data;

in accordance with a determination that the user goal cannot be derived from the voice data with a sufficient level of confidence, identifying one or more concepts represented by the voice data based at least in part on a set of concept rules;

determining a first search constraint based at least in part on the voice data, the first search constraint comprising two or more search constraint properties associated with the voice data and selected from a set of properties comprising a direct property representing that a respective search constraint was derived from a statement represented by the voice data and maps directly to metadata associated with a set of electronic content items, an unselective property representing that a respective search constraint is narrowing and imprecise, a selective property representing that a respective search constraint is likely to return to search results that meet a goal of a requester, an inferred property representing that a respective search constraint was inferred from the voice data, and a transformed property representing that a respective search constraint with a particular unselective property has been transformed to a different search constraint with a particular selective property, the first search constraint representative of at least one concept of the one or more concepts;

determining a plurality of search query plans for searching a database based at least in part on the first search constraint including the two or more search constraint properties, individual search query plans comprising unique combinations of search constraints selected from a set of search constraints comprising the first search constraint and other search constraints;

querying the database using a first search query plan of the plurality of search query plans; and providing search results for presentation at the voice-controlled device, the search results corresponding to the first search query plan.

15. The one or more non-transitory computer-readable media of claim 14, wherein the instructions further cause the one or more computer systems to perform operations comprising:

prior to determining the plurality of search query plans, receiving subsequent voice data from the user; and removing at least one search constraint from the other search constraints based at least in part on the subsequent voice data.

16. The one or more non-transitory computer-readable media of claim 14, wherein the instructions further cause the one or more computer systems to perform operations comprising, querying the database using remaining search query plans of the plurality of search query plans, querying the database using the first search query plan and querying the database using the remaining search query plans occurring at about the same time.

17. The computer-implemented method of claim 4, wherein determining the plurality of search query plans comprises computing a score for each search query plan based at least in part on the respective unique combination of search constraints, and wherein the method further comprises selecting the one or more search query plans based on the respective scores for each search query plan.

18. The computer-implemented method of claim 4, wherein querying the database comprises executing the one or more search query plans, and wherein executing the one or more search query plans is performed after determining the plurality of search query plans and selecting the one or more search query plans from among the plurality of search query plans.

19. The system of claim 1, wherein the request for information is further based at least in part on the least one concept, and wherein the request is configured to illicit response information to refine the at least one concept.

20. The system of claim 1, wherein the memory comprises additional computer-executable instructions that, when executed by the processor, cause the processor to transform the first search constraint to define a transformed search constraint based at least in part on one or more transformation rules, and wherein determining the plurality of search query plans is based at least in part on the transformed first search constraint, the second search constraint, and other search constraints.

* * * * *